US012696283B2

(12) United States Patent

He et al.

(10) Patent No.: US 12,696,283 B2

(45) Date of Patent: Jul. 28, 2026

(54) SYSTEMS, METHODS, AND APPARATUSES FOR CROSS DIVISION DUPLEX OPERATION IN WIRELESS COMMUNICATION

(71) Applicant: APPLE INC., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 256 days.

(21) Appl. No.: 17/821,572

(22) Filed: Aug. 23, 2022

(65) Prior Publication Data

US 2023/0073130 A1 Mar. 9, 2023

Related U.S. Application Data

(60) Provisional application No. 63/260,824, filed on Sep. 1, 2021.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/0012* (2013.01);
(Continued)

(58) Field of Classification Search
CPC ............... H04W 72/23; H04W 72/044; H04W 72/0446; H04W 72/0453; H04W 72/51;
(Continued)

(56) References Cited

U.S. PATENT DOCUMENTS

2019/0268903 A1 8/2019 Lee et al.
2019/0364602 A1 11/2019 Yi et al.
(Continued)

FOREIGN PATENT DOCUMENTS

CN 111279740 A 6/2020
CN 112584539 A 3/2021
(Continued)

OTHER PUBLICATIONS

MCC Support , "Draft Report of 3GPP TSG RAN WG1 #105-e V0.2.0 (Online meeting)", R1-210xxxx, e-Meeting, Aug. 16-27, 2021, 141 pages.
(Continued)

*Primary Examiner* — Jung H Park
(74) *Attorney, Agent, or Firm* — Dorsey & Whitney LLP

(57) ABSTRACT

Systems, methods, and apparatuses for cross division duplex (XDD) operation in a wireless communication system are described herein. A user equipment (UE) is configured with one or more sub-bands (SBs) within a larger overall bandwidth (BW) (e.g., represented by a component carrier (CC), a bandwidth part (BWP), etc.), and that use uplink (UL)/downlink (DL) resource allocation(s) that may be different than the larger BW. Configurations for such SB-specific (SBS) arrangements that use guard bands (GBs) between SBs are discussed. Mechanisms for slot format indications (SFIs) within such SBs using either SBS DCI or cross-SB DCI are discussed. Mechanisms for providing SBS uplink resource for initial access (e.g., random access) using at least one initial UL BWP that is configured relative to one or more
(Continued)

SBs and that may be used by XDD-capable UEs are discussed.

19 Claims, 15 Drawing Sheets

(51) Int. Cl.

| | |
|---|---|
| *H04L 5/00* | (2006.01) |
| *H04W 72/044* | (2023.01) |
| *H04W 72/0446* | (2023.01) |
| *H04W 72/0453* | (2023.01) |
| *H04W 72/51* | (2023.01) |
| *H04W 74/08* | (2024.01) |
| *H04W 74/0833* | (2024.01) |

(52) U.S. Cl.
CPC ......... *H04L 5/0094* (2013.01); *H04W 72/044* (2013.01); *H04W 72/0446* (2013.01); *H04W 72/0453* (2013.01); *H04W 72/51* (2023.01); *H04W 74/0833* (2013.01); *H04W 74/0841* (2013.01); *H04W 74/0866* (2013.01)

(58) Field of Classification Search
CPC ......... H04W 74/0841; H04W 74/0866; H04W 8/24; H04W 48/12; H04W 74/006; H04W 74/0833; H04W 72/232; H04W 72/0457; H04L 1/1812; H04L 5/0012; H04L 5/0094; H04L 5/0078; H04L 5/0092; H04L 5/14; H04L 5/0044; H04L 5/001; H04L 5/0053

See application file for complete search history.

(56) References Cited

U.S. PATENT DOCUMENTS

| | | | |
|---|---|---|---|
| 2020/0068443 A1 | 2/2020 | Liu et al. | |
| 2020/0252978 A1 | 8/2020 | Yi et al. | |
| 2020/0288441 A1 | 9/2020 | Park et al. | |
| 2020/0382267 A1 | 12/2020 | Soriaga et al. | |
| 2020/0396736 A1 | 12/2020 | Sun et al. | |
| 2021/0135833 A1 | 5/2021 | Hao et al. | |
| 2021/0152418 A1 | 5/2021 | Abdelghaffar et al. | |
| 2021/0176626 A1 | 6/2021 | Abdelghaffar et al. | |
| 2021/0258962 A1* | 8/2021 | Kuang | H04L 27/0006 |
| 2021/0377938 A1 | 12/2021 | Huang et al. | |
| 2021/0399858 A1 | 12/2021 | Yang et al. | |
| 2021/0400654 A1* | 12/2021 | Ibrahim | H04W 72/20 |
| 2022/0200682 A1 | 6/2022 | Hirzallah et al. | |
| 2022/0225425 A1 | 7/2022 | Xing et al. | |
| 2022/0353923 A1 | 11/2022 | Xu | |
| 2022/0408474 A1 | 12/2022 | Liu et al. | |
| 2023/0007952 A1 | 1/2023 | Wu | |
| 2023/0024023 A1 | 1/2023 | Amuru et al. | |
| 2023/0068789 A1 | 3/2023 | Christoffersson et al. | |
| 2023/0080106 A1 | 3/2023 | Ji et al. | |
| 2023/0300845 A1* | 9/2023 | Yoshimura | H04W 72/1268 370/329 |
| 2023/0379966 A1* | 11/2023 | Nogami | H04W 72/231 |

| | | | |
|---|---|---|---|
| 2024/0032103 A1 | 1/2024 | Rastegardoost et al. | |
| 2024/0196437 A1 | 6/2024 | Awadin et al. | |
| 2024/0373470 A1 | 11/2024 | Jeon et al. | |

FOREIGN PATENT DOCUMENTS

| | | | |
|---|---|---|---|
| CN | 112997549 A | 6/2021 |
| CN | 113261366 A | 8/2021 |
| EP | 3681233 A1 | 7/2020 |
| EP | 3716723 A1 | 9/2020 |
| KR | 20190032906 A | 3/2019 |
| KR | 20190086043 A | 7/2019 |
| KR | 20210013003 A | 2/2021 |
| KR | 20210090420 A | 7/2021 |
| WO | 2019216910 A1 | 11/2019 |
| WO | 2020196804 A1 | 10/2020 |
| WO | 2021158480 A1 | 8/2021 |
| WO | 2021160778 A1 | 8/2021 |
| WO | 2021242931 A1 | 12/2021 |
| WO | 2022006342 A1 | 1/2022 |
| WO | 2022198500 A1 | 9/2022 |

OTHER PUBLICATIONS

Ji, Hyoungju , et al., "Extending 5G TDD Coverage With XDD: Cross Division Duplex", IEEE Access vol. 9, Digital Object Identifier 10.1109/Access.2021.3068977, Mar. 26, 2021, pp. 51380-51392.

U.S. Appl. No. 17/821,565, Non-Final Office Action, Dec. 9, 2024, 20 pages.

3GPP TS 38.331, "3rd Generation Partnership Project; Technical Specification Group Radio Access Network; NR; Radio Resource Control (RRC) protocol specification (Release 15)", V15.14.0, Jun. 2021, 540 pages.

U.S. Appl. No. 17/821,552, Final Office Action, Oct. 8, 2025, 25 pages.

Vivo, "CR on TS38.101-1 for NR V2X", R4-2014972, 3GPP TSG-RAN4 Meeting #97-e, Electronic Meeting, Change Request 38.101-1 CR 0525 Current version 16.5.0, Nov. 2-13, 2020, 6 pages.

CMCC, "Considerations on BWP switching and multi-activation for NR-U", R2-1818129 (Resubmission of R2-1815251) 3GPP TSG-RAN WG2 Meeting #104, Spokane, USA, Agenda Item 11.2.1.2, Nov. 12-16, 2018, 3 pages.

LG Electronics, "Aspects related to the reduced maximum UE bandwidth of RedCap", R1-2107448, 3GPP TSG RAN WG1 Meeting #106-e, e-Meeting, Agenda Item 8.6.1.1, Aug. 16-27, 2021, 13 pages.

LG Electronics, "Discussion on potential UE complexity reduction features", R1-2008048, 3GPP TSG RAN WG1 Meeting #103-e, e-Meeting, Agenda Item 8.6.1, Oct. 26-Nov. 13, 2020, 8 pages.

Qualcomm Incorporated, "TP for DL signals and channels for NR-U", R1-2000954, 3GPP TSG RAN WG1 Meeting #100e, Agenda Item 7.2.2.1.2, Feb. 24-Mar. 6, 2020, 7 pages.

U.S. Appl. No. 17/821,565, Notice of Allowance, Mar. 24, 2025, 7 pages.

U.S. Appl. No. 17/821,552, Non-Final Office Action, Mar. 28, 2025, 25 pages.

U.S. Appl. No. 17/821,552, Non-Final Office Action, Jan. 14, 2026, 25 pages.

* cited by examiner

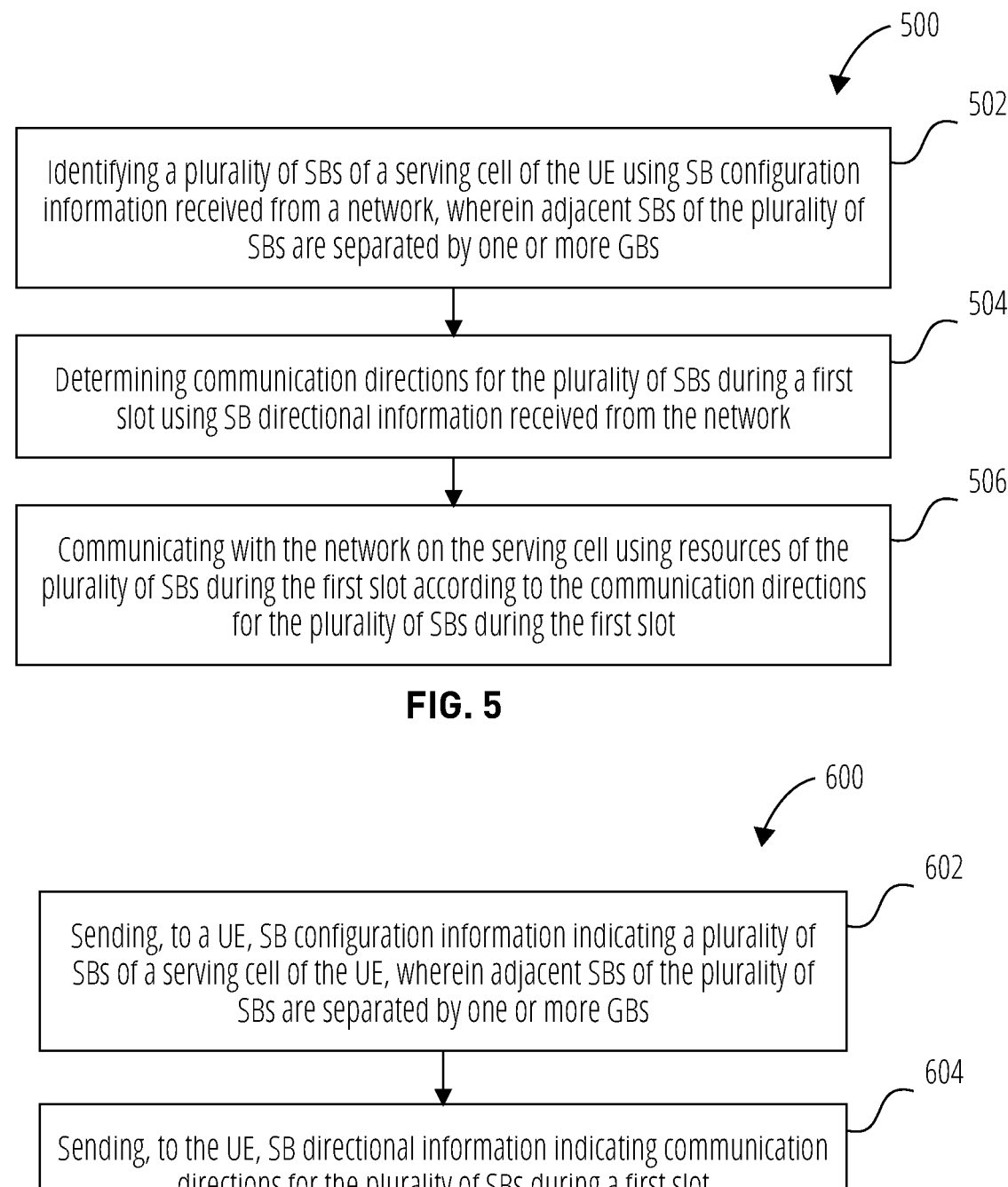

500

502

Identifying a plurality of SBs of a serving cell of the UE using SB configuration information received from a network, wherein adjacent SBs of the plurality of SBs are separated by one or more GBS

504

Determining communication directions for the plurality of SBs during a first slot using SB directional information received from the network

506

Communicating with the network on the serving cell using resources of the plurality of SBs during the first slot according to the communication directions for the plurality of SBs during the first slot

Sending, to a UE, SB configuration information indicating a plurality of SBs of a serving cell of the UE, wherein adjacent SBs of the plurality of SBs are separated by one or more GBS

604

Sending, to the UE, SB directional information indicating communication directions for the plurality of SBs during a first slot

606

Communicating with the UE on the serving cell using resources of the plurality of SBs during the first slot according to the communication directions for the plurality of SBs during the first slot

Sending, to a UE, SB configuration information identifying a plurality of SBs of a serving cell useable by the UE to communicate with the network

904

Sending, to the UE, a first DCI in a first CORESET of a first SB of the plurality of SBS, wherein the first DCI provides first slot format information for the first SB

906

Sending, to the UE, a second DCI in a second CORESET of a second SB of the plurality of SBS, wherein the second DCI provides second slot format information for the second SB

908

Communicating with the UE on the first SB according to the first slot format information and on the second SB according to the second slot format information

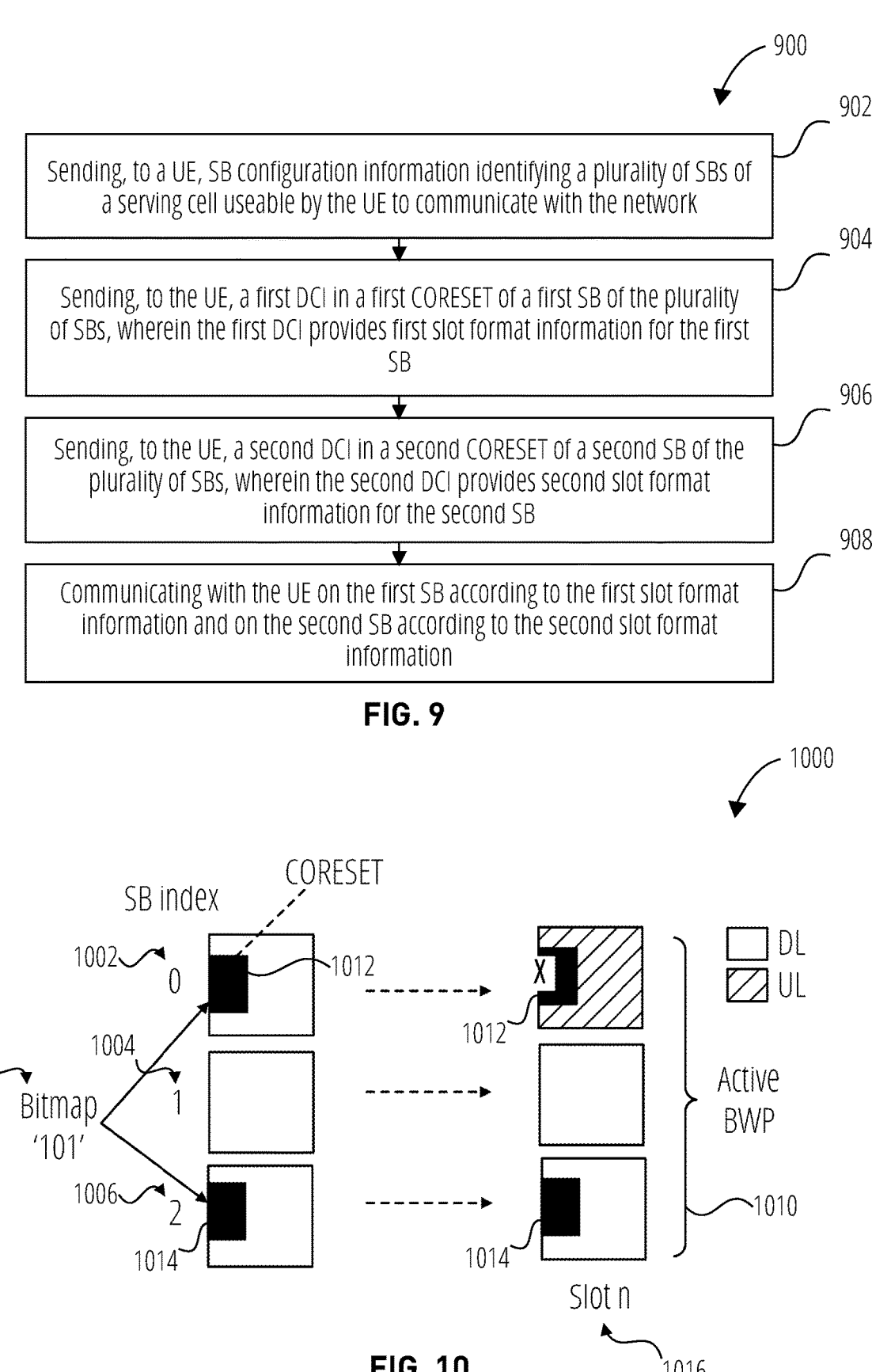

FIG. 10

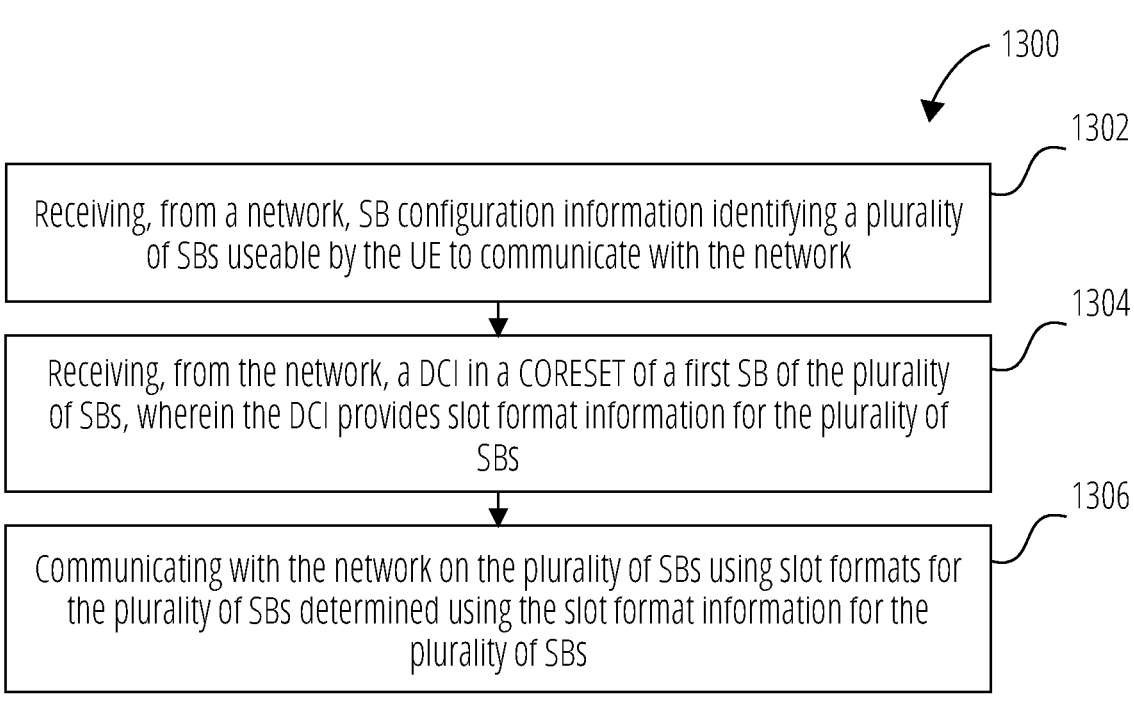

1300

1302
Receiving, from a network, SB configuration information identifying a plurality of SBS useable by the UE to communicate with the network 1304
Receiving, from the network, a DCI in a CORESET of a first SB of the plurality of SBs, wherein the DCI provides slot format information for the plurality of SBS 1306
Communicating with the network on the plurality of SBS using slot formats for the plurality of SBs determined using the slot format information for the plurality of SBS

FIG. 13

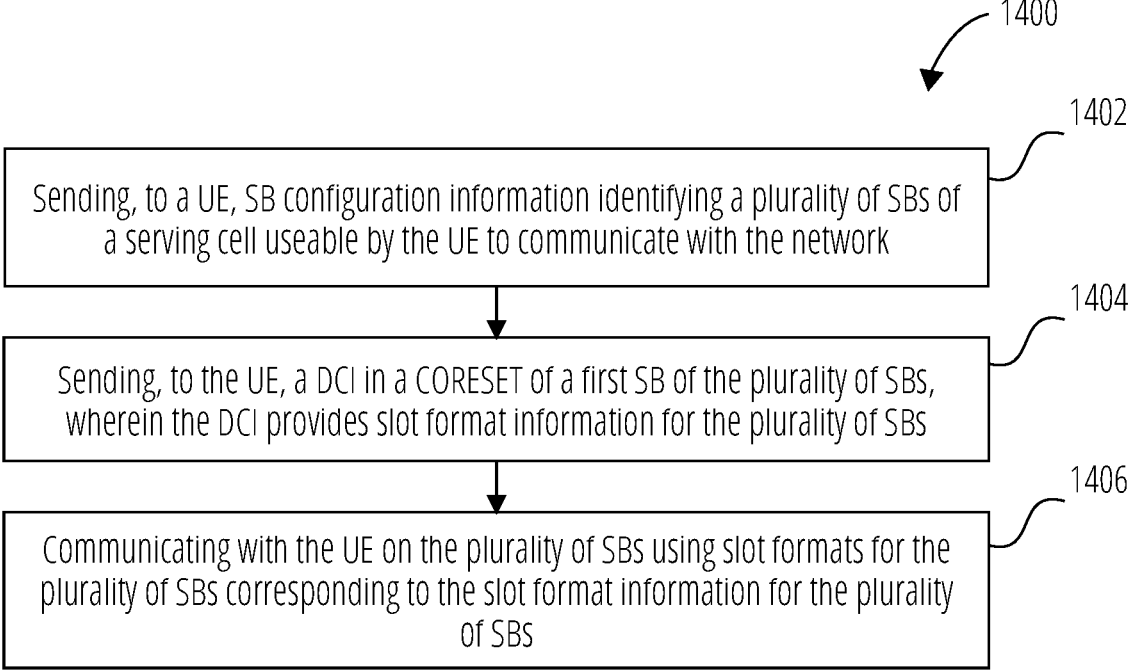

1400

1402
Sending, to a UE, SB configuration information identifying a plurality of SBS of a serving cell useable by the UE to communicate with the network 1404
Sending, to the UE, a DCI in a CORESET of a first SB of the plurality of SBs, wherein the DCI provides slot format information for the plurality of SBS 1406
Communicating with the UE on the plurality of SBS using slot formats for the plurality of SBS corresponding to the slot format information for the plurality of SBS

FIG. 14

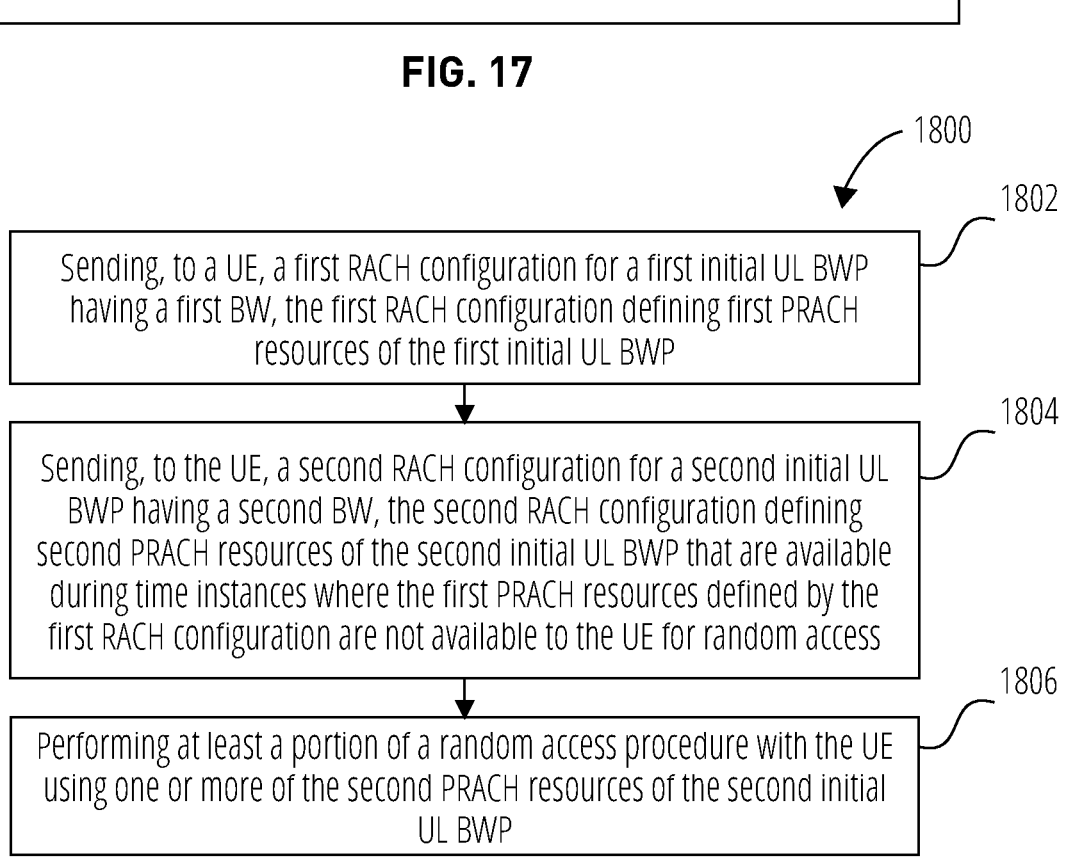

1700

1702

Receiving, from a network, a first RACH configuration for a first initial UL BWP having a first BW, the first RACH configuration defining first PRACH resources of the first initial UL BWP

1704

Receiving, from the network, a second RACH configuration for a second initial UL BWP having a second BW, the second RACH configuration defining second PRACH resources of the second initial UL BWP that are available during time instances where the first PRACH resources defined by the first RACH configuration are not available to the UE for random access

1706

Performing at least a portion of a random access procedure with the network using one or more of the second PRACH resources of the second initial UL BWP

Sending, to a UE, a first RACH configuration for a first initial UL BWP having a first BW, the first RACH configuration defining first PRACH resources of the first initial UL BWP

1804

Sending, to the UE, a second RACH configuration for a second initial UL BWP having a second BW, the second RACH configuration defining second PRACH resources of the second initial UL BWP that are available during time instances where the first PRACH resources defined by the first RACH configuration are not available to the UE for random access

1806

Performing at least a portion of a random access procedure with the UE using one or more of the second PRACH resources of the second initial UL BWP

FIG. 18

SYSTEMS, METHODS, AND APPARATUSES FOR CROSS DIVISION DUPLEX OPERATION IN WIRELESS COMMUNICATION

TECHNICAL FIELD

This application relates generally to wireless communication systems, including the use of cross division duplex (XDD) operation within such wireless communication systems.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mmWave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a method of UE, according to an embodiment.

FIG. 6 illustrates a method of a RAN, according to an embodiment.

FIG. 9 illustrates a method of a RAN, according to an embodiment.

FIG. 10 illustrates a diagram of an example of bitmap-based signaling for CORESET.

FIG. 13 illustrates a method of a UE, according to an embodiment.

FIG. 14 illustrates a method of a RAN, according to an embodiment.

FIG. 17 illustrates a method of a UE, according to an embodiment.

FIG. 18 illustrates a method of a RAN, according to an embodiment.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Cross division duplex (XDD) includes the simultaneous transmission (Tx) and reception (Rx) by a device on the same carrier. XDD may be used in various communication systems (e.g., including, but not limited to, wireless communications systems defined by 3GPP). One candidate of XDD techniques may be a sub-band full duplex (SBFD) technique, where simultaneous Tx/Rx of downlink (DL) and uplink (UL) at a base station (e.g., gNB) using non-overlapping frequency resources referred to herein as sub-bands (SBs) occurs even while a UE is nominally configured for half-duplex operation at that time instance, (e.g., for half-duplex operation that is for either Tx or Rx, but not both).

Figure 1:
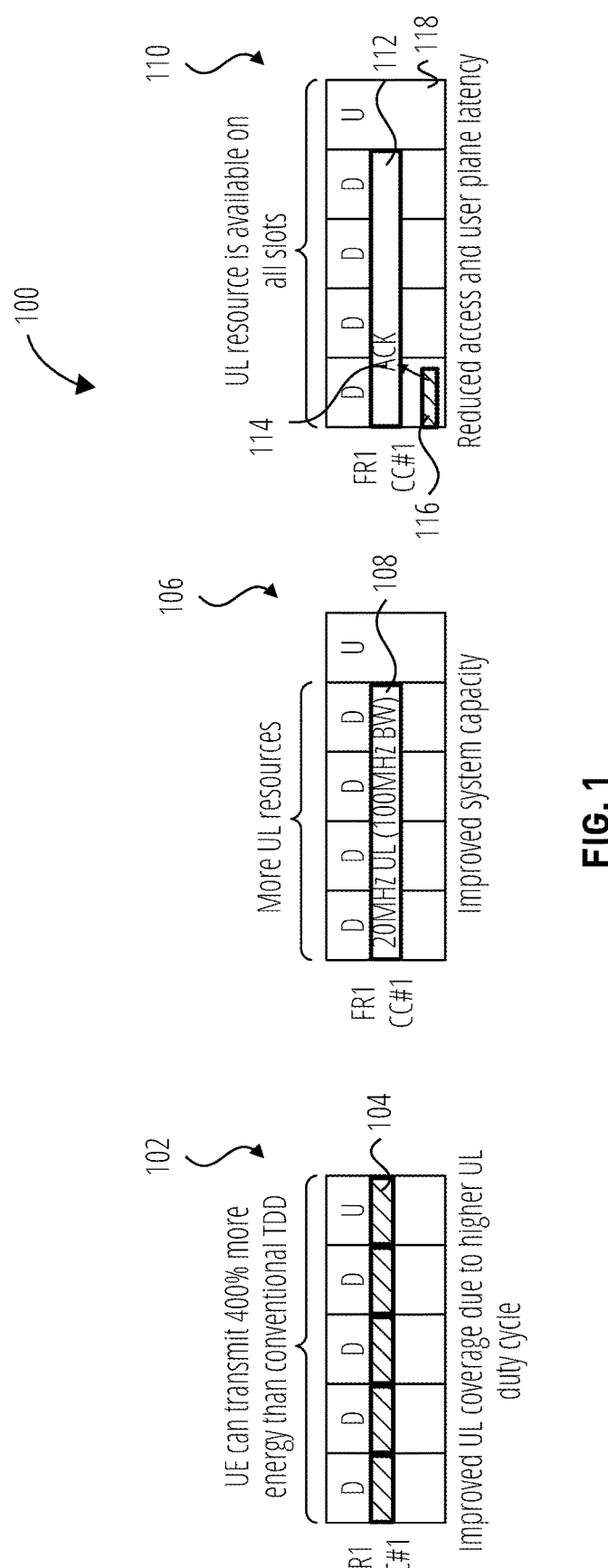
FIG. 1 illustrates diagrams of TDD arrangements illustrating benefits achievable using XDD operation over legacy TDD UL/DL RA methods in an unpaired spectrum.

FIG. 1 illustrates diagrams 100 of TDD arrangements illustrating benefits achievable using XDD operation over legacy TDD UL/DL resource allocation (RA) methods in an unpaired spectrum.

The first TDD arrangement 102 includes the first SB 104, which is configured for UL transmission. While it can be seen that the first TDD arrangement 102 is configured for a first UL duty cycle of, for example, one UL slot after every four DL slots, the first SB 104 may be used to provide a higher UL duty cycle than this corresponding to resources in the first SB 104. This may allow for, for example, additional repetitions of a set of UL data in the first SB 104 during the illustrated DL slots (which may not otherwise be possible without the first SB 104). In the first TDD arrangement 102, this may result in some UL signaling being transmitted over an additional 4 slots, resulting in up to 400% more energy than in the legacy TDD case, thereby improving UL coverage.

The second TDD arrangement 106 includes the second SB 108, which is configured to use 20 MHz of a 100 MHz total bandwidth within the second TDD arrangement 106 for UL transmission, in the manner illustrated. This provides additional UL resources than would otherwise be available, which may result in an improved/more efficient use of overall system capacity, for example in a case where there is a need/use for more UL resources relative to DL resources than would otherwise be the case in the second TDD arrangement 106 without the second SB 108. It is noted that the use of sub-bands in this manner could be flexibly and dynamically configured in order to provide a robust UL/DL resource adaption scheme according to changes in UL/DL traffic demands over time.

The third TDD arrangement 110 includes the second SB 112, which is configured for UL transmission. As illustrated, the UE may receive DL signaling 116 in the first downlink slot. Because of the existence of the second SB 112, the UE may transmit an acknowledgement 114 (e.g., hybrid automatic repeat request acknowledgement (HARQ-ACK) bit(s)) in the second SB 112 much earlier than it otherwise would have been able to (e.g., by waiting for the later UL slot 118 illustrated in the third TDD arrangement 110). This improves uplink latency/reduces feedback delay within the wireless communication system.

Discussion herein provides methods and arrangements to enable resource-efficient XDD operation, and/or to support a faster initial access and/or random access channel (RACH) procedure. For example, the present disclosure discusses systems and methods for configuring sub-band-specific (SPS) UL/DL operation in the context of a component carrier (CC)/bandwidth part (BWP) framework, systems and methods for the construction and transmission of slot format indication(s) (SFI(s)) for XDD operation, and systems and methods for configuring and using SBS uplink resources for faster initial access and/or random access procedures between the UE and the network.

SBS UL/DL Configurations

A variety of approaches can be considered for SB configuration for a given CC with shared spectrum channel access.

In a first alternative (Alt. 1): For a given CC, a set of one or more SBs may be configured on a per-CC basis (e.g., in a cell-specific manner). In this case, SB configuration information may be provided from the network to the UE that configures and/or defines the set of SBs relative to a bandwidth of the serving cell.

Under Alt. 1, a set of SB directional information may also be sent to the UE. This SB directional information may include a semi-static SB directional information for each configured SB. This semi-static SB directional information may be delivered to the UE in one or more system information block (SIBs). Alternatively or additionally, semi-static SB directional information may be delivered to the UE in radio resource control (RRC) signaling (e.g., in SBS UL/DL configuration information found in the RRC signaling). This RRC signaling may be directed to a common set of UE using the CC (in which case a tdd-UL-DL-ConfigurationCommon-r18 information element (IE) may be used for the SBS UL/DL configuration information). In other cases, this RRC signaling may be dedicated to a particular UE (in which case a tdd-UL-DL-ConfigurationDedicated-r18 IE may be used for the SBS UL/DL configuration information).

It is also contemplated that in some embodiments under Alt. 1, SB directional information may include dynamic SB directional information for one or more SBs received from the network in downlink control information (DCI) (e.g., in addition to semi-static SB directional information).

Under Alt. 1, A XDD UE is configured with a set of BWPs that are aggregations of the CC-specific sub-band(s).

In a second alternative (Alt.2): A XDD UE is first configured with a set of one or more BWP(s). Within each BWP, a set of one or more sub-bands may then be additionally configured for that UE (e.g., on a UE-specific basis, corresponding to the UE's particular configured set of BWP(s)). This SB configuration information may be provided by the network to the UE on a UE-specific basis.

Under Alt. 2, a set of SB directional information may also be sent to the UE. This SB directional information may include semi-static SB directional information for each configured SB. This semi-static SB directional information may be delivered to the UE in radio resource control (RRC) signaling (e.g., in SBS UL/DL configuration information found in the RRC signaling) that is dedicated to the particular UE (in which case a tdd-UL-DL-ConfigurationDedicated-r18 IE may be used for SBS UL/DL configuration information).

It is also contemplated that in some embodiments under Alt. 2, SB directional information may include dynamic SB directional information for one or more SBs received from the network in downlink control information (DCI) (e.g., in addition to semi-static SB directional information).

It is noted that for each of Alt.1 and Alt.2, the provided SB directional information may be understood to override flexible symbols per slot over the applicable number of slots, as configured by higher layer signaling from the network.

Figure 2:
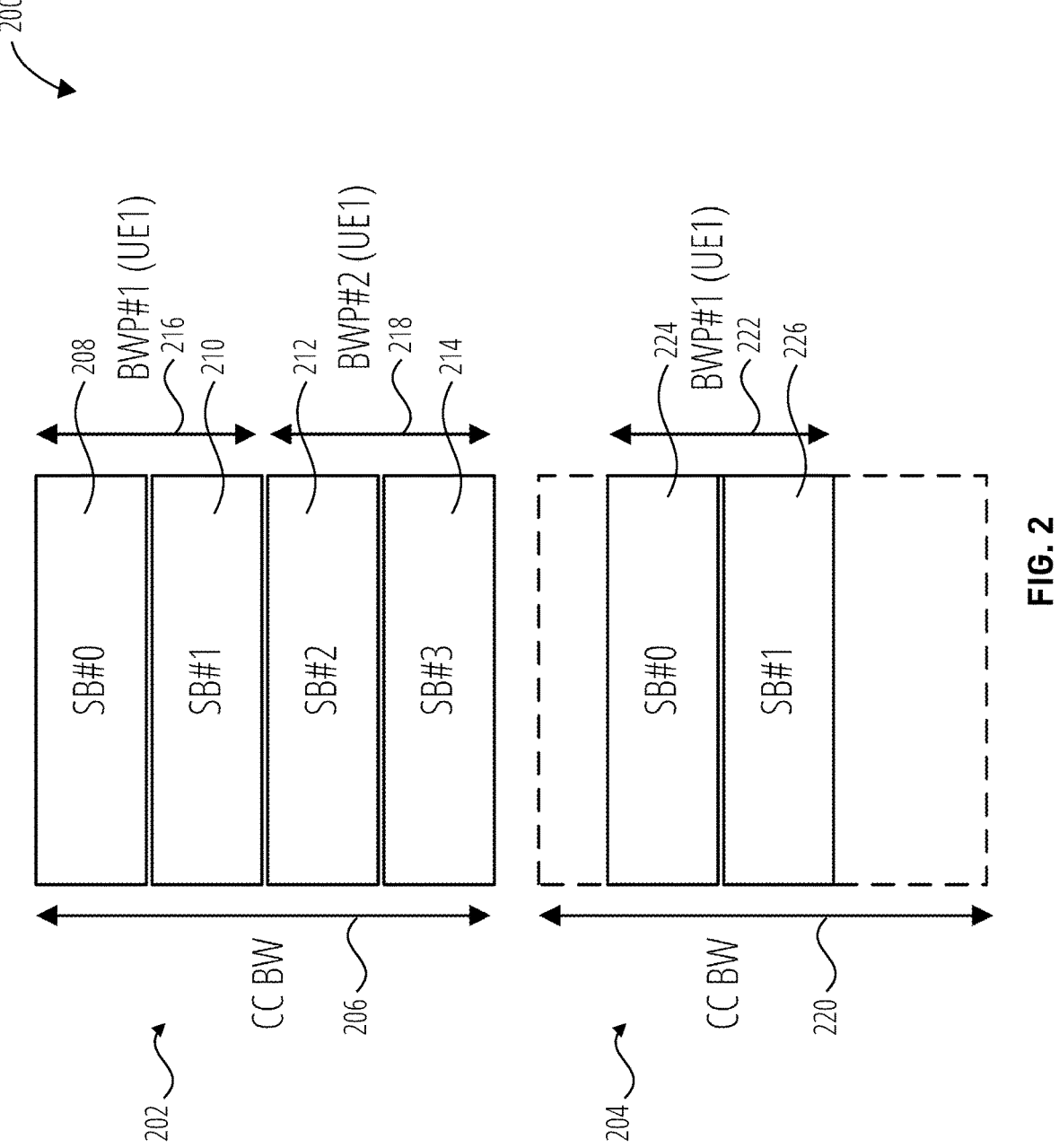
FIG. 2 illustrates diagrams of SB arrangements corresponding to SB configuration information.

FIG. 2 illustrates diagrams 200 of SB arrangements corresponding to SB configuration information. A first arrangement 202 illustrates a cell-specific sub-band configuration (e.g., corresponding to Alt. 1) and a second arrangement 204 illustrates a BWP-specific sub-band configuration (e.g., corresponding to Alt. 2).

Referring to first arrangement 202 (corresponding to Alt. 1), the entire CC BW 206 is first divided with four SBs (the SB #0 208, the SB #1 210, the SB #2 212, and the SB #3 214) in a cell-specific manner. Then, BWP #1 216 is configured by aggregating SB #0 208 and SB #1 210, while BWP #2 218 is configured by aggregating SB #2 212 and SB #3 214.

Referring to second arrangement 204 (corresponding to Alt. 2), the UE is first configured with BWP #1 222 within the CC BW 220. Then, for that BWP #1 222 at that particular UE, the SB #0 224 and the SB #1 226 are configured.

In some embodiments for XDD operation discussed herein, guard bands (GBs) may be used between adjacent SBs. Herein, "adjacent SBs" include SBs that are not separated by other intervening SBs (but that may have zero or more GBs between them in the manner discussed herein).

In some embodiments, an intra-cell GB list may be provided for a cell with XDD operation, which has a one-to-one mapping for GBs between any two adjacent SBs starting from an adjacent pair of SBs SB #0 and SB #1 and continuing through the remaining adjacent pairs of SBs in the SB configuration. In some cases, if such an intra-cell GB list is not configured, the value (e.g., size of) a GB between adjacent SBs may be as pre-established per a definition for the particular type of wireless communication system (e.g., in the case of a 3GPP wireless communication system, this value may be set according to a 3GPP specification).

In some designs, to improve resource usage/efficiency when using GBs, one or more intra-cell GBs between adjacent SBs may be analyzed to determine whether the particular GB is valid for RA at a given time (e.g., despite nominally being a GB). In such cases, a variety of options may be considered to determine whether the intra-cell GB is valid for RA semi-statically or dynamically, in the manner that is discussed herein. Note that in alternative designs, all GBs may simply be assumed to not be available for RA (to simplify UE implementation at the cost of throughput degradation relative to designs that may use the GBs).

Two types of intra-CC guard-band may be defined to facilitate the discussion of the embodiments herein. A "Type1" intra-CC GB refers to a guard band located between two adjacent SBs using a same communication direction (e.g., both using UL, or both using DL) during a given time (e.g., during a given slot). The Type1 designation for that GB may apply during that given time where such a corresponding directional arrangements of the SBs is the case. A "Type2" intra-CC guard-band refers to a guard band located between two adjacent SBs using different communication directions (e.g., one using UL, one using DL) during the given time, or where one or more of the two adjacent SBs uses an unknown communication direction (e.g. direction in at least one of two consecutive SB is unknown or 'flexible' for a given UE) during the given time. The Type2 designation for that GB may apply during that given time where such a non-corresponding directional arrangement of the SBs is the case.

In some cases, a determination/identification of Type1/Type2 for intra-CC GBs as between the SBs during the given time may be made in a semi-static manner. For example, this determination/identification may be based on analysis of semi-static SB directional information (e.g., semi-static SB directional information received in and SIB or in an RRC message).

Alternatively or additionally, a determination/identification of Type1/Type2 for intra-CC GBs as between the SBs during the given time may be made in a dynamic manner. For example, this determination may be based on dynamic SB directional information from dynamic DCI, including DCI 2_0 and/or scheduling DCI. It is contemplated that in some embodiments, semi-static SB directional information as further modified or further detailed by dynamic SB directional information may control the determination/identification of Type1/Type2 for intra-CC GBs as between the SBs during the given time.

Once a determination/identification of Type1/Type2 for intra-CC GBs as between the SBs during the given time is made, it may be that Type1 intra-CC GB(s) are used for RA, in order to maximize the spectrum efficiency. This use is acceptable because there is no actual need for a GB in the physical layer between two SBs having a same communication direction during the given time. On the other hand, any Type2 intra-CC GBs remain unused for RA, in order that they may appropriately guard against cross-link interference between their corresponding SBs that have (potentially) different communication directions during the given time.

In view of the preceding discussion, it may be understood that the use of dynamic SB directional information for the determination/identification of Type1/Type2 for intra-CC GBs as between the SBs during the given time as has been described for some embodiments herein may further improve the resource efficiency over embodiments that do not use dynamic SB directional information, (by enabling the identification of (e.g., additional) Type1 intra-CC GBs that are established according to the dynamic SB directional information). For such embodiments, it may be that a UE capable of dynamically adjusting the applicable RF filter(s) based on the DCI content may be needed, which corresponds to additional functional complexity at the UE than may be present by default in all UEs operable with an applicable wireless communications system. Accordingly, in some designs, support of a dynamic intra-CC GB utilization method (e.g., that uses dynamic SB directional information) between the network and any particular UE as described herein may be subject to UE capability report from that UE to the network indicating to the network that the UE has the capability of basing determinations of whether GBs are valid for RA (or not) using dynamic SB directional information.

Figure 3:
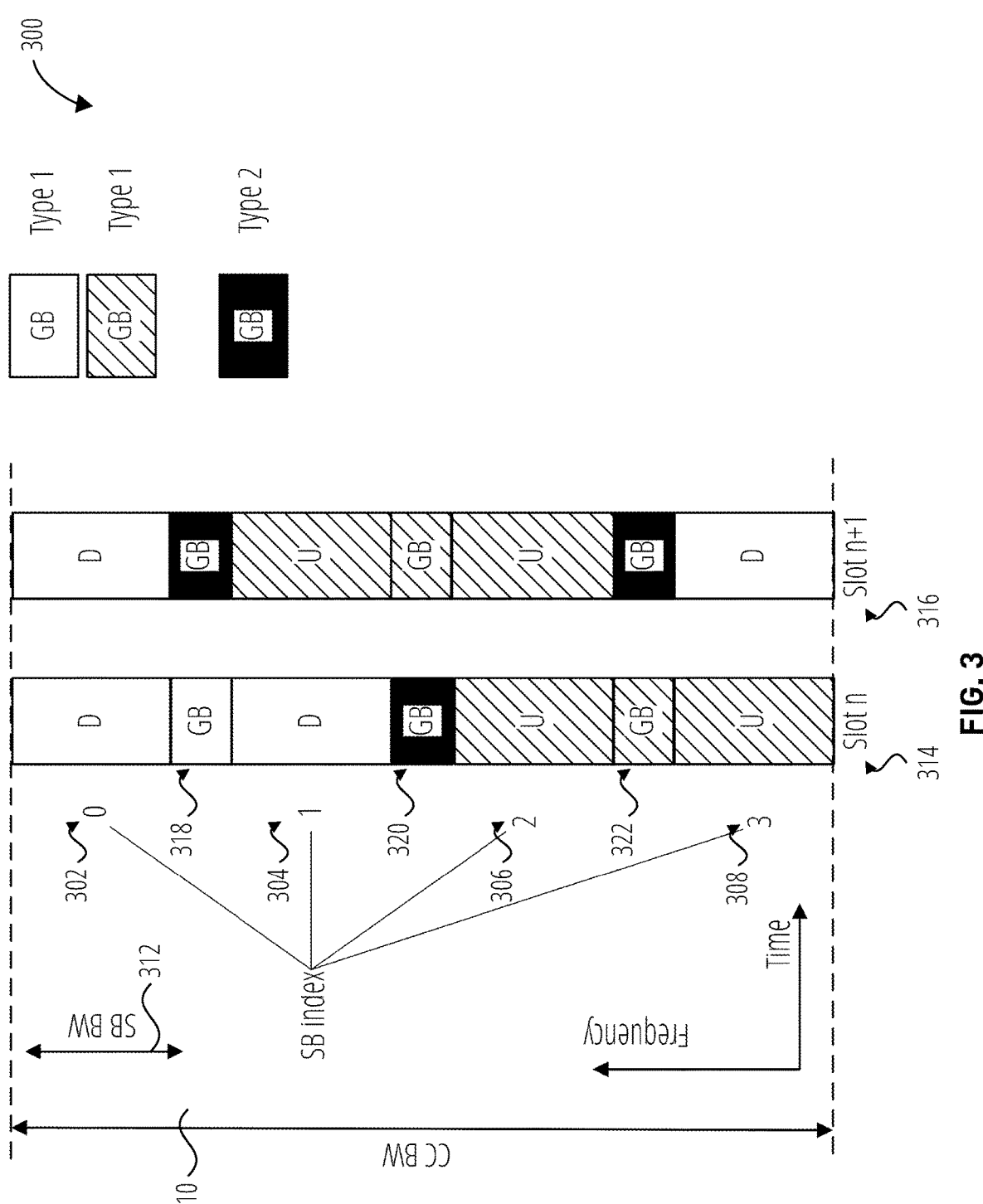
FIG. 3 illustrates a diagram showing the use of intra-CC GB types, according to an embodiment.

FIG. 3 illustrates a diagram 300 showing the use of intra-CC GB types, according to an embodiment. The diagram 300 illustrates the communication directions of various SBs (SB #0 302, SB #1 304, SB #2 306, and SB #3 308) of a CC (e.g., configured within the CC BW 310) during a pair of slots (a first slot 314 (labelled "Slot n" in the diagram 300) and a second slot 316 (labelled "Slot n+1" in the diagram 300)). The diagram 300 also illustrates the first GB 318 between the SB #0 302 and the SB #1 304, the second GB 320 between the SB #1 304 and the SB #2 306, and the third GB 322 between the SB #2 306 and the SB #3 308

It is noted that while the SB #0 302, the SB #1 304, the SB #2 306, and the SB #3 308 have been illustrated here with a single uniform SB BW 312, this is not required (in other cases, the SBs may be of differing and/or unique BWs).

During the first slot 314, Type1 intra-CC guard bands include the first GB 318 and the third GB 322. For the first GB 318, this is because SB #0 302 and SB #1 304 each operate in a DL communication direction during the first slot 314. For the third GB 322, this is because SB #2 306 and SB #3 308 each operate in an UL communication direction during the first slot 314.

Accordingly, the first GB 318 and second GB 320 are both valid (e.g., addressable) for RA during the first slot 314, with the first GB 318 being usable in a DL communication direction corresponding to the DL communication direction of the SB #0 302 and the SB #1 304 during the first slot 314, and with the third GB 322 being usable in an UL communication direction corresponding to the UL communication direction of the SB #2 306 and the SB #3 308 during the first slot 314. It is noted that the difference in shading between the first GB 318 and the third GB 322 in FIG. 3 is due to the different corresponding communication direction of the associated SBs (but that each type of shading used in the first GB 318 and the third GB 322 corresponds to a Type1 intra-CC guard band).

During the first slot 314, the second GB 320 is Type2 intra-CC GB during the first slot 314, because it is located between the SB #1 304 and SB #2 306 that operate in different communication directions during the first slot 314. Accordingly, the third GB 322 is not valid (e.g., addressable) for RA during the first slot 314.

For the second slot 316, UL/DL direction for the SB #1 304 and the SB #3 308 is switched (e.g., by higher layers or DCI).

As a consequence of this change, during the second slot 316, the second GB 320 is a Type1 intra-CC guard band, because it is located between SB #1 304 and SB #2 306, which each operate in an UL direction during the second slot 316. Accordingly, the second GB 320 is valid (e.g., addressable) for RA during the second slot 316 in an UL direction corresponding to the UL communication direction of the SB #1 304 and the SB #2 306 during the second slot 316.

During the second slot 316, the first GB 318 and the third GB 322 are Type2 intra-CC GBs, because each is located between the SBs that operate in different communication directions during the second slot 316. Accordingly, the first GB 318 and the third GB 322 are not valid (e.g., addressable) for RA during the second slot 316.

Accordingly, s depicted in the diagram 300 of FIG. 3, it will be understood that intra-CC GB typing corresponding to GBs between two adjacent SBs varies across slots depending on a SB's UL/DL configuration.

It is noted that such typing determinations like those described herein may be made by each of a UE and an element of the network (e.g., a base station of a RAN). As a result of this determination by the network element, the network is aware of GBs in which it may or may not perform RA. As a result of this determination by the UE, the UE is aware of GBs in which it may or may not expect valid RA to be performed by the network.

Some wireless communications systems (e.g., 3GPP wireless communications systems using NR RAT) support Type0 and Type1 frequency domain RA methods. A Type0 RA is a bitmap-based scheme that performs RA in granularities of resource block groups (RBGs). In such cases, an RBG size may be one of, e.g., 2, 4, 8, or 16 physical resource blocks (PRBs).

This value may be determined based on a current BWP size. In addition, a UE may assume that precoding granularity for a physical downlink shared channel (PDSCH) (e.g., a precoder resource group (PRG) size) can be equal to one of 2 or 4 PRBs in the RBG, or that the wideband is used for this purpose.

One potential issue is whether and/or how to handle a case where there is a (partial) collision between an RBG that is a candidate for Type0 RA and a Type2 GB that should not be considered valid for RA for the reasons discussed herein.

Figure 4:
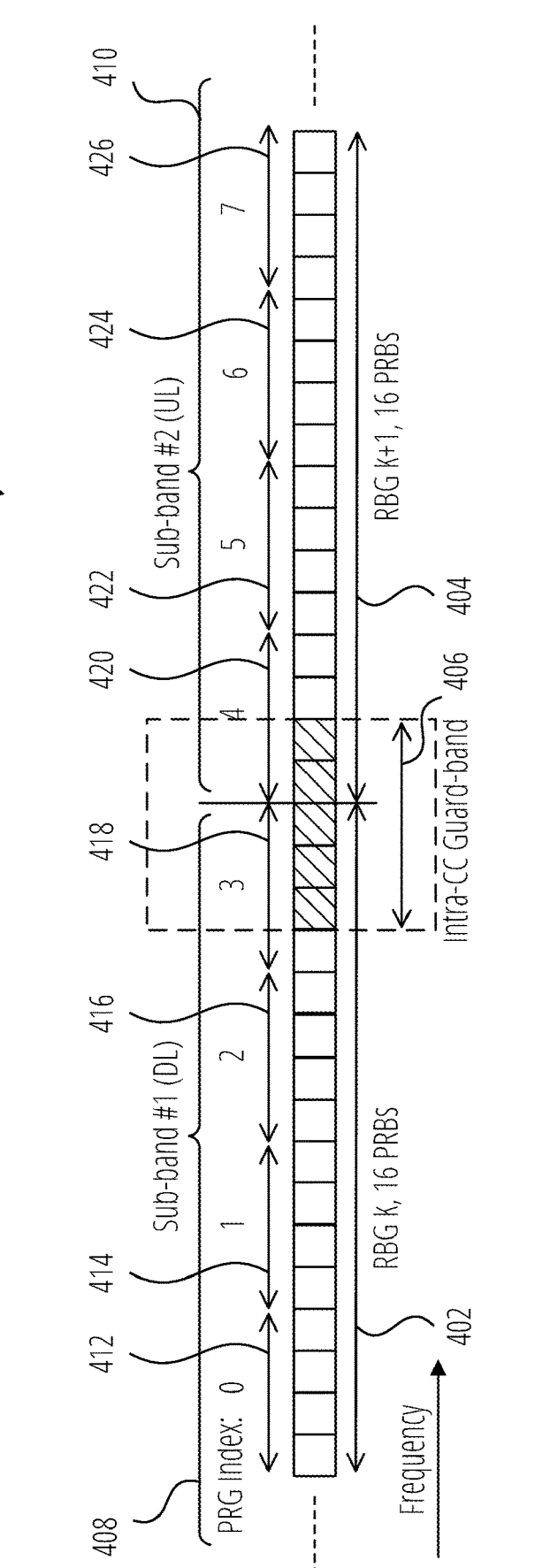
FIG. 4 illustrates a diagram of a case where there is a collision between each of a first RBG and a second RBG that are a candidates for Type0 RA and a Type2 GB that should not be considered valid for RA.

FIG. 4 illustrates a diagram 400 of a case where there is a collision between each of a first RBG 402 and a second RBG 404 that are a candidates for Type0 RA and a Type2 GB 406 that should not be considered valid for RA. In the diagram 400, the particular RBs that collide with the GB 406 have been shaded for visual emphasis (with three such PRBs present in first RBG 402 and two such PRBs present in the second RBG 404, as illustrated). The GB 406 is a Type2 GB because, as illustrated, it is located between the SB #1 408, which is operating in the DL communication direction at the illustrated time, and the SB #2 410, which is operating in the UL communication direction at the illustrated time.

The diagram 400 of FIG. 4 corresponds to a case where the RBG size is 16 PRBs. Accordingly, each of the first RBG 402 and the second RBG 404 is illustrated with 16 PRBs. Further, the diagram 400 of FIG. 4 corresponds to a case where the and PRG size is equal to 4 PRBs Accordingly, the first RBG 402 includes the PRG #0 412, PRG #1 414, PRG #2 416, and PRG #3 418 having four PRBs each, and the second RBG 404 includes the PRG #4 420, the PRG #5 422, the PRG #6 424, and the PRG #7 426 having four PRBs each. This arrangement is given by way of example and not by way of limitation (as other arrangements using PRB sizes/values for an RBG and/or a PRG as described herein may instead apply).

In relation to the diagram 400 of in FIG. 4, a variety of options for resolving collisions between an RBG that is a candidate for Type0 RA and a Type2 GB that should not be considered valid for RA can be explained.

In a first option (Opt. 1), any partially overlapped RBG is not used for Type0 RA. Under Opt. 1, the entire first RBG 402 and the entire second RBG 404 are not available for Type0 RA. The removal of two entire RBGs of 16 PRBs each may represent a relatively significant degradation of throughput performance for UE using Type0 RA in relation to other options discussed herein.

In a second option (Opt.2), any PRB overlapped with Type2 intra-CC GB is not available for Type0 RA. Under Opt.2, only the overlapped PRBs (the five shaded PRBs across the first RBG 402 and the second RBG 404) are rate-matched (and therefore not available). Opt.2 may therefore provide better resource utilization and throughput performance relative to other options discussed herein. On the other hand, Opt.2 may increases UE complexity due to the need to handle an increased number of smaller/shortened PRG(s) that are punctured by Type2 intra-CC guard band (e.g., with the PRG #3 418 having only one usable PRB and the PRG #4 420 having only two useable PRBs).

In a third option (Opt.3), any PRG that is overlapped or partially overlapped with Type2 intra-CC GB is not used for Type-0 RA. Opt.3 may represent a tradeoff among other options discussed herein between UE complexity and resource utilization. Under this option, the PRG #0 412, the PRG #1 414, and the PRG #2 416 of the first RBG 402, and the PRG #5 422, the PRG #6 424, and the PRG #7 426 of the second RBG 404 remain addressable (useable) for Type0 RA.

FIG. 5 illustrates a method 500 of UE, according to an embodiment. The method 500 includes identifying 502 a plurality of SBs of a serving cell of the UE using SB configuration information received from a network, wherein adjacent SBs of the plurality of SBs are separated by one or more GBs.

The method 500 further includes determining 504 communication directions for the plurality of SBs during a first slot using SB directional information received from the network.

The method 500 further includes communicating 506 with the network on the serving cell using resources of the plurality of SBs during the first slot according to the communication directions for the plurality of SBs during the first slot.

In some embodiments of the method 500, the SB configuration information defines the plurality of SBs relative to a bandwidth of the serving cell. In some such embodiments, the SB directional information comprises semi-static SB directional information received from the network in an SIB. In some such embodiments, the SB directional information comprises semi-static SB directional information received from the network in RRC signaling. In some such instances using RRC signaling, the RRC signaling is dedicated RRC signaling for the UE. In some such embodiments, the SB directional information comprises dynamic SB directional information received from the network in a DCI.

In some embodiments of the method 500, the SB configuration information defines the plurality of SBs relative to one or more BWPs of the serving cell that are configured to the UE.

In some such embodiments, the SB directional information comprises semi-static SB directional information received from the network in dedicated RRC signaling for the UE. In some such embodiments, the SB directional information comprises dynamic SB directional information received from the network in a DCI.

In some embodiments, the method 500 further includes sending, to the network, a UE capability report indicating whether the UE is capable of basing a determination of whether any of the one or more GBs are valid for resource allocation using dynamic SB directional information.

In some embodiments of the method 500, a first SB of the plurality of SBs and a second SB of the plurality of SBs that is adjacent to the first SB use different communication directions during the first slot, and the method 500 further includes determining that resources of a first GB of the one or more GBs that separates the first SB and the second SB are not valid for resource allocation by the network during the first slot because the first SB and the second SB use the different communication directions during the first slot. In some such embodiments, the method 500 further includes determining communication directions for the plurality of SBs during a second slot using the SB directional information, wherein the first SB and the second SB use a same communication direction during the second slot, and determining that resources of the first GB are valid for resource allocation by the network during the second slot because the first SB and the second SB use the same communication direction during the second slot.

In some embodiments of the method 500, a first SB of the plurality of SBs and a second SB of the plurality of SBs that is adjacent to the first SB use a same communication direction during the first slot, and further comprising determining that resources of a first GB of the one or more GBs that separates the first SB and the second SB are valid for resource allocation by the network during the first slot because the first SB and the second SB use the same communication direction during the first slot. In some such embodiments, The method 500 further includes determining communication directions for the plurality of SBs during a second slot using the SB directional information, wherein the first SB and the second SB use different communication directions during the second slot, and determining that resources of the first GB are not valid for resource allocation by the network during the second slot because the first SB and the second SB use the different communication directions during the second slot.

In some embodiments of the method 500, a first SB of the plurality of SBs and a second SB of the plurality of SBs that is adjacent to the first SB are separated by a first GB of the one or more GBs and use different communication directions during the first slot, and the method 500 further includes determining that an RBG that overlaps the first SB and the first GB is not valid for a Type0 RA by the network for the first slot.

In some embodiments of the method 500, a first SB of the plurality of SBs and a second SB of the plurality of SBs that is adjacent to the first SB are separated by a first GB of the one or more GBs and use different communication directions during the first slot, and the method 500 further includes determining that a PRB of an RBG of a Type0 RA that is located in the first GB is not valid for the Type0 RA by the network for the first slot.

In some embodiments of the method 500, a first SB of the plurality of SBs and a second SB of the plurality of SBs that is adjacent to the first SB are separated by a first GB of the one or more GBs and use different communication directions during the first slot, and the method 500 further includes determining that a PRG of an RBG of a Type0 RA that overlaps the first GB is not valid for the Type0 RA by the network for the first slot.

FIG. 6 illustrates a method 600 of a RAN, according to an embodiment. The method 600 includes sending 602, to a UE, SB configuration information indicating a plurality of SBs of a serving cell of the UE, wherein adjacent SBs of the plurality of SBs are separated by one or more GBs.

The method 600 further includes sending 604, to the UE, SB directional information indicating communication directions for the plurality of SBs during a first slot.

The method 600 further includes communicating 606 with the UE on the serving cell using resources of the plurality of SBs during the first slot according to the communication directions for the plurality of SBs during the first slot.

In some embodiments of the method 600, the SB configuration information defines the plurality of SBs relative to a bandwidth of the serving cell. In some such embodiments, the SB directional information comprises semi-static SB directional information sent to the UE in a SIB. In some such embodiments, the SB directional information comprises semi-static SB directional information sent to the UE in RRC signaling. In some such instances using RRC signaling, the RRC signaling is dedicated RRC signaling for the UE. In some such embodiments, the SB directional information comprises dynamic SB directional information sent to the UE in a DCI.

In some embodiments of the method 600, the SB configuration information defines the plurality of SBs relative to one or more BWPs of the serving cell that are configured to the UE.

In some such embodiments, the SB directional information comprises semi-static SB directional information sent to the UE in dedicated RRC signaling for the UE. In some such embodiments, the SB directional information comprises dynamic SB directional information sent to the UE in a DCI. In some such instances using a DCI, the method 600 further includes receiving, from the UE, a UE capability report indicating that the UE is capable of basing a determination of whether any of the one or more GBs are valid for resource allocation on the dynamic SB directional information, wherein the dynamic SB directional information is sent to the UE in the DCI in response to receiving the UE capability report.

In some embodiments of the method 600, a first SB of the plurality of SBs and a second SB of the plurality of SBs that is adjacent to the first SB use different communication directions during the first slot, and the method 600 further includes determining not to allocate resources of a first GB of the one or more GBs that separates the first SB and the second SB for use during the first slot because the first SB and the second SB use the different communication directions during the first slot. In some such embodiments, the first SB and the second SB use the same communication direction during a second slot, and the method 600 further includes allocating a resource of the first GB for use in the same communication direction as the first SB and the second SB during the second slot.

In some embodiments of the method 600, a first SB of the plurality of SBs and a second SB of the plurality of SBs that is adjacent to the first SB use a same communication direction during the first slot, and the method 600 further includes allocating a resource of a first GB of the one or more GBs that separates the first SB and the second SB for use in the same communication direction as the first SB and the second SB during the first slot. In some such embodiments, the first SB and the second SB use different communication directions during a second slot, and the method 600 further includes determining not to allocate resources of the first GB for use during the second slot because the first SB and the second SB use the different communication directions during the second slot.

In some embodiments of the method 600, a first SB of the plurality of SBs and a second SB of the plurality of SBs that is adjacent to the first SB are separated by a first GB of the one or more GBs and use different communication directions during the first slot, and the method 600 further includes determining that a RBG that overlaps the first SB and the first GB is not available for Type0 RA for the first slot.

In some embodiments of the method 600, a first SB of the plurality of SBs and a second SB of the plurality of SBs that is adjacent to the first SB are separated by a first GB of the one or more GBs and use different communication directions during the first slot, and the method 600 further includes performing Type0 RA for the first slot on a RBG that overlaps the first SB and the first GB during the first slot, wherein a PRB of the RBG that is located in the first GB is not used in the Type0 RA.

In some embodiments of the method 600, a first SB of the plurality of SBs and a second SB of the plurality of SBs that is adjacent to the first SB are separated by a first GB of the one or more GBs and use different communication directions during the first slot, and the method 600 further includes performing Type0 RA for the first slot on a RBG that overlaps the first SB and the first GB during the first slot, wherein a PRG of the RBG that overlaps the first GB is not used in the Type0 RA.

Slot Format Indication for XDD Operation

Embodiments herein relate to approaches for the use of DCI (e.g., DCI format 2_0) transmitted between a network and the UE to indicate a slot format (e.g., to indicate UL/DL directions for symbols in a slot). Information in a DCI that is used to indicate and/or inform regarding slot formats may be understood as an example of slot format information.

In a first approach for the use of DCI to indicate slot formats (Approach 1), an SBS DCI (e.g., DCI format 20) that is used to notify the UE of a slot format for a corresponding SB may be used. In some embodiments, for each SB used by a UE, the UE may be configured with a separate control resource set (CORESET) and a corresponding Type3 physical downlink control channel (PDCCH) common search space (CSS) set for monitoring for such DCI and/or such DCI may have cyclic redundancy check (CRC) bits scrambled by a dedicated slot format indicator radio network temporary identifier (SFI-RNTI).

Figures 7, 8:
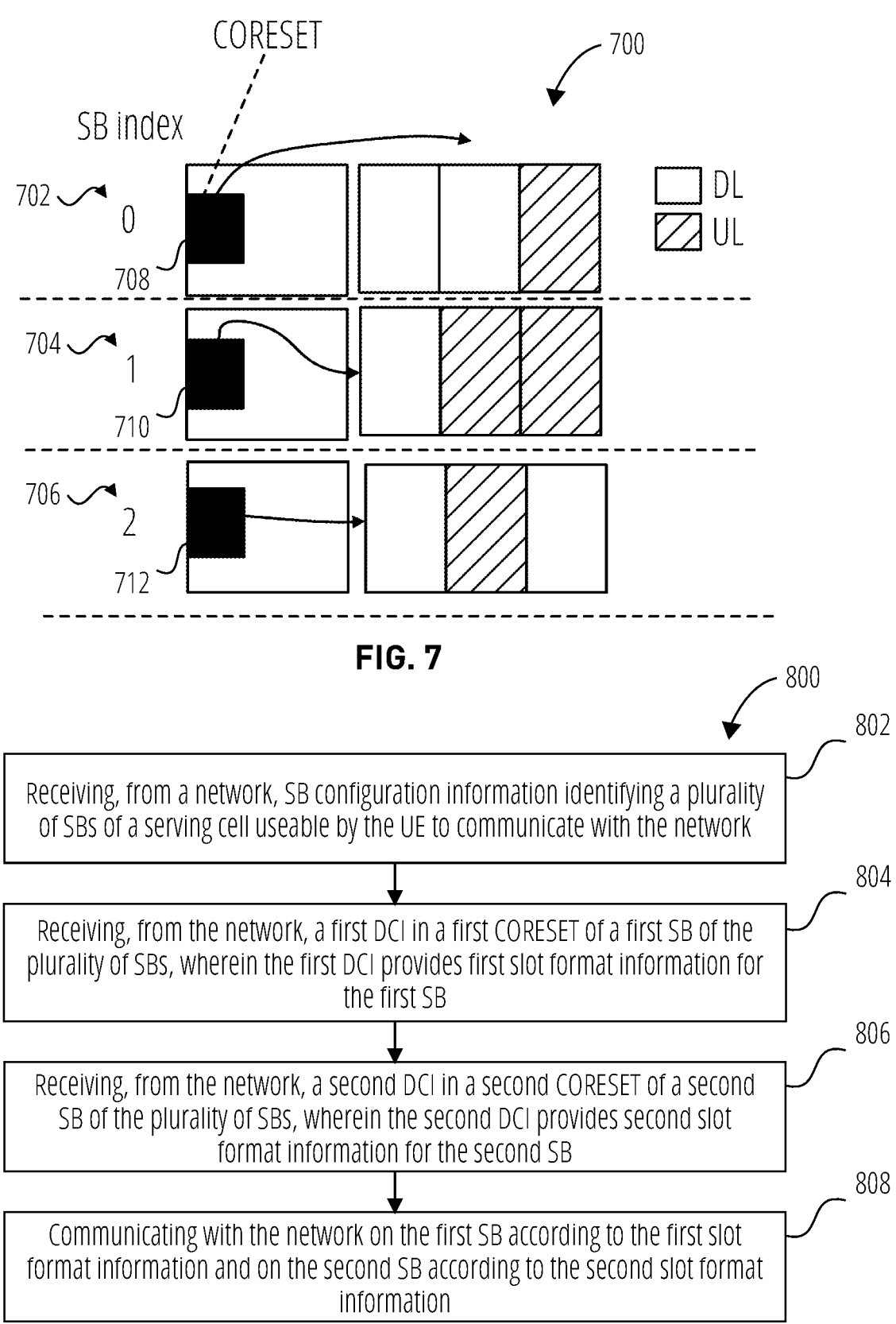
FIG. 7 illustrates a diagram 700 of an example of the use of SBS DCI for XDD operation.
FIG. 8 illustrates a method of a UE, according to an embodiment.

FIG. 7 illustrates a diagram 700 of an example of the use of SBS DCI for XDD operation. The diagram 700 may correspond to Approach 1 as described herein. As may be understood in reference to the diagram 700, a UE may monitor multiple sub-band specific Type3 PDCCH CSSs for DCI (e.g., DCI format 20), where each DCI received in a given SB may then provide a slot format for that SB. The diagram 700 illustrates an SB #0 702, an SB #1 704, and an SB #2 706 that are used by a UE to communicate with the network. The SB #0 702 is configured with a first CORESET 708, the SB #1 704 is configured with a second CORESET 710, and the SB #2 706 is configured with a third CORESET 712.

Each of these SBs is then searched in a Type3 PDCCH CSS within its respective CORESET for a DCI (e.g., a DCI 20) that provides a slot format that is to be used on that SB. As illustrated, a DCI located in the first CORESET 708 provides a slot format for the two DL symbols followed by an UL symbol (etc.) in the SB #0 702, a DCI located in the second CORESET 710 provides a slot format for the DL symbol followed by two UL symbols (etc.) in the SB #1 704, and a DCI located in the third CORESET 712 provides a slot format for the DL symbol followed by and UL symbol followed by a DL symbol (etc.) in the SB #2 706.

FIG. 8 illustrates a method 800 of a UE, according to an embodiment. The method 800 includes receiving 802, from a network, SB configuration information identifying a plurality of SBs of a serving cell useable by the UE to communicate with the network.

The method 800 further includes receiving 804, from the network, a first DCI in a first CORESET of a first SB of the plurality of SBs, wherein the first DCI provides first slot format information for the first SB.

The method 800 further includes receiving 806, from the network, a second DCI in a second CORESET of a second SB of the plurality of SBs, wherein the second DCI provides second slot format information for the second SB.

The method 800 further includes communicating 808 with the network on the first SB according to the first slot format information and on the second SB according to the second slot format information.

In some embodiments of the method 800, the first SB and the second SB are located on a same BWP.

In some embodiments, the method 800 further includes monitoring a first Type3 PDCCH CSS in the first SB for the first DCI, wherein the first DCI is received in the first Type3 PDCCH CSS, and monitoring a second Type3 PDCCH CSS in the second SB for the second DCI, wherein the second DCI is received in the second Type3 PDCCH CSS.

In some embodiments of the method 800, the first DCI is of a DCI format 2_0 that is used to notify the UE of a slot format for the first SB.

In some embodiments of the method 800, the first DCI comprises CRC bits that are scrambled by a dedicated SFI-RNTI.

FIG. 9 illustrates a method 900 of a RAN, according to an embodiment. The method 900 includes sending 902, to a UE, SB configuration information identifying a plurality of SBs of a serving cell useable by the UE to communicate with the network.

The method 900 further includes sending 904, to the UE, a first DCI in a first CORESET of a first SB of the plurality of SBs, wherein the first DCI provides first slot format information for the first SB.

The method 900 further includes sending 906, to the UE, a second DCI in a second CORESET of a second SB of the plurality of SBs, wherein the second DCI provides second slot format information for the second SB.

The method 900 further includes communicating 908 with the UE on the first SB according to the first slot format information and on the second SB according to the second slot format information.

In some embodiments of the method 900, the first SB and the second SB are located on a same BWP.

In some embodiments of the method 900, the first DCI is sent in a first Type3 PDCCH common search space (CSS) in the first SB, and the second DCI is sent in a second Type3 PDCCH CSS in the second SB.

In some embodiments of the method 900, the first DCI is of a DCI format 2_0 that is used to notify the UE of a slot format for the first SB.

In some embodiments, the method 900 further includes scrambling CRC bits of the first DCI using a dedicated SFI-RNTI prior to sending the first DCI.

In a second approach for the use of DCI to indicate slot formats (Approach 2), cross-SB DCI may be used. Cross-SB DCI may be of a DCI format 2_0 that is used to notify the UE of slot formats for a plurality of SBs. In some embodiments, for a CORESET that is associated with monitoring for such DCI, a bitmap may be provided to UE. The bits of the bitmap may have a one-to-one mapping with the configured SBs at the UE, in ascending order of the SB index in the DL BWP.

FIG. 10 illustrates a diagram 1000 of an example of bitmap-based signaling for CORESET. This bitmap-based signaling may increase the probability of a successful DCI transmission/successful transmission of SFI for the SB #0 1002, the SB #1 1004, and the SB #2 1006. The diagram 1000 illustrates that that an SB #0 1002, and SB #1 1004, and an SB #2 1006 have been configured within a BWP 1010 used by a UE. The UE may also be configured with a bitmap 1008 having bits '101' that indicate CORESETs (with Type3 CSS) of particular SBs for which to monitor for cross-SB DCI. Note that is may be that DCI are sent in a Type3 CSS, and/or with CRC bits scrambled by an SFI-RNTI.

Corresponding to the '101' indication of the bitmap 1008, the UE determines to monitor for cross-SB DCI in CORE-SETs of each of the SB #0 1002 and the SB #2 1006 (because the first and third bit of the bitmap are '1' bits, and the SB #0 1002 and the SB #2 1006 are respectively the first- and third-order SBs in the configuration), and further determines not to monitor for cross-SB DCI in the SB #1 1004 (because the second bit of the bitmap is a '0' bit and the SB #1 1004 is the second-order SB in the configuration). Accordingly, the UE monitors for cross-SB DCI in each of the first CORESET 1012 found in the SB #0 1002 and the second CORESET 1014 found in the second CORESET 1014.

Compared to Approach 1, Approach 2 is beneficial from a signaling flexibility perspective, because it increases the probability of successful transmission of slot format information for the individual SBs within the XDD operation. As illustrated in the diagram 1000, it may be the case that, for example, the measurement occasion 1016 (corresponding to "Slot n" as labelled in FIG. 10) on SB #0 is used for UL rather the DL (and thus the first CORESET 1012 of the SB #0 1002 is not monitored by the UE during the measurement occasion 1016, as indicated by the "X"). In such a case, due to the cross-SB nature of the DCI that notifies the UE of slot formats for a plurality of SBs (e.g., for each/all of the SB #0 1002, the SB #1 1004, and the SB #2 1006), the base station can still successfully communicate slot format information for the SB #0 1002 during the measurement occasion 1016, because the cross-SB DCI detected in the second CORESET 1014 in SB #2 during the measurement occasion 1016 has this information.

Formatting a use of such cross-SB DCI under Approach 2 are now discussed. For each SB in each serving cell, the UE may be provided a location of a SFI index field in a cross-SB DCI (e.g., in the form of a positionInDCI IE). The UE may also be provided a set of one or more slot format combinations for that SB (e.g., in one or more slotFormat-Combinations IEs). Each slot format combination in the set of slot format combinations may include one or more slot formats indicated by a respective slotFormats IE for the slot format combination, and a mapping for the slot format combination provided by the slotFormats IE to a corresponding SFI index field value that may be used in DCI to indicate that particular slot format combination (and this mapping may be provided by a slotFormatCombinationId IE).

Figure 11:
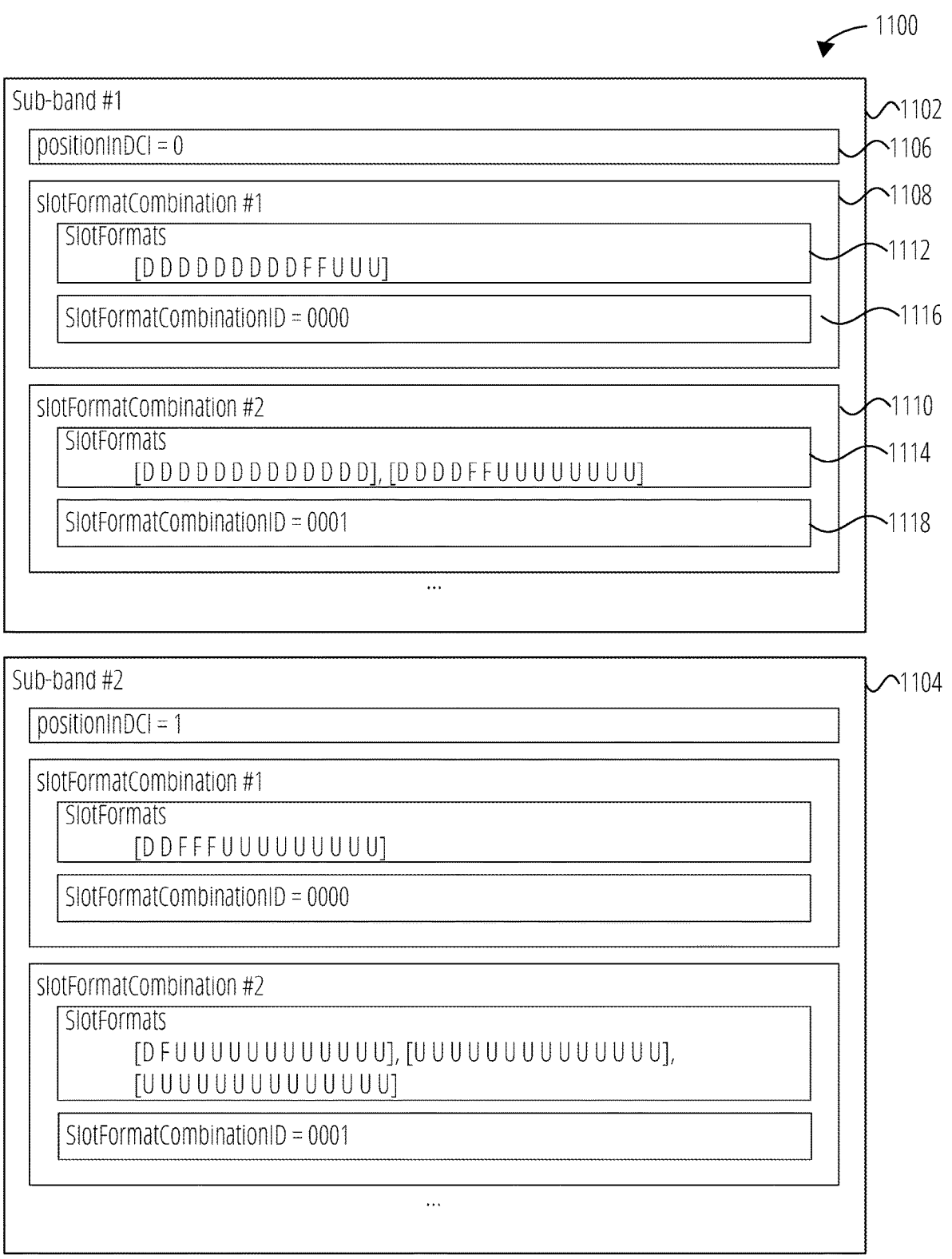
FIG. 11 illustrates a visualized arrangement for information that may be provided to a UE by a network such that the UE is enabled to use cross-SB DCI.

FIG. 11 illustrates a visualized arrangement 1100 for information that may be provided to a UE by a network such that the UE is enabled to use cross-SB DCI. As illustrated, the information may be provided relative to multiple SBs (e.g., the SB #1 1102 and the SB #2 1104, but more or fewer of these may be present in other embodiments). For each SB, a location of an SFI index field corresponding to the SB in a DCI may be provided. For example, a DCI may include X SFI index fields, indexed from 0 to X−1. In such cases, the positionInDCI IE 1106 for a SB is used by the network to indicate a location of the SFI index field associated to the SB in the DCI (and thus the range of possible values for the positionInDCI IE 1106 is between 0 and X−1). For example, in the arrangement 1100, the positionInDCI IE 1106 for the SB #1 1102 indicates that the SB #1 1102 corresponds to an SFI index field a first SFI index field position (represented by the use of index 0) in the DCI. Further, for each SB, one or multiple slot format combinations may be provided (e.g., the SB #1 1102 is provided with the first slot format combination 1108 and the second slot format combination 1110, but more or fewer of these may be present in other embodiments).

For each slot format combination, one or more slot formats may be provided (for example, the slotFormats IE 1112 of the first slot format combination 1108 provides a single slot format (in terms of DL symbols "D", UL symbols "U", and flexible symbols "F"), while the slotFormats IE 1114 of the second slot format combination 1110 provides two slot formats. Further, for each slot combination, a mapping to/for a value for that slot format combination (for example, the first slotFormatCombinationID IE 1116 of the first slot format combination 1108 indicates that the first slot format combination 1108 is associated with the value "0000", while the second slotFormatCombinationID IE 1118 indicates that the second slot format combination 1110 is associated with the value "0001". This value identifies the corresponding slot format combination for the SB to the UE when that value is found at the SFI index field for the SB in DCI received at the UE.

Figure 12:
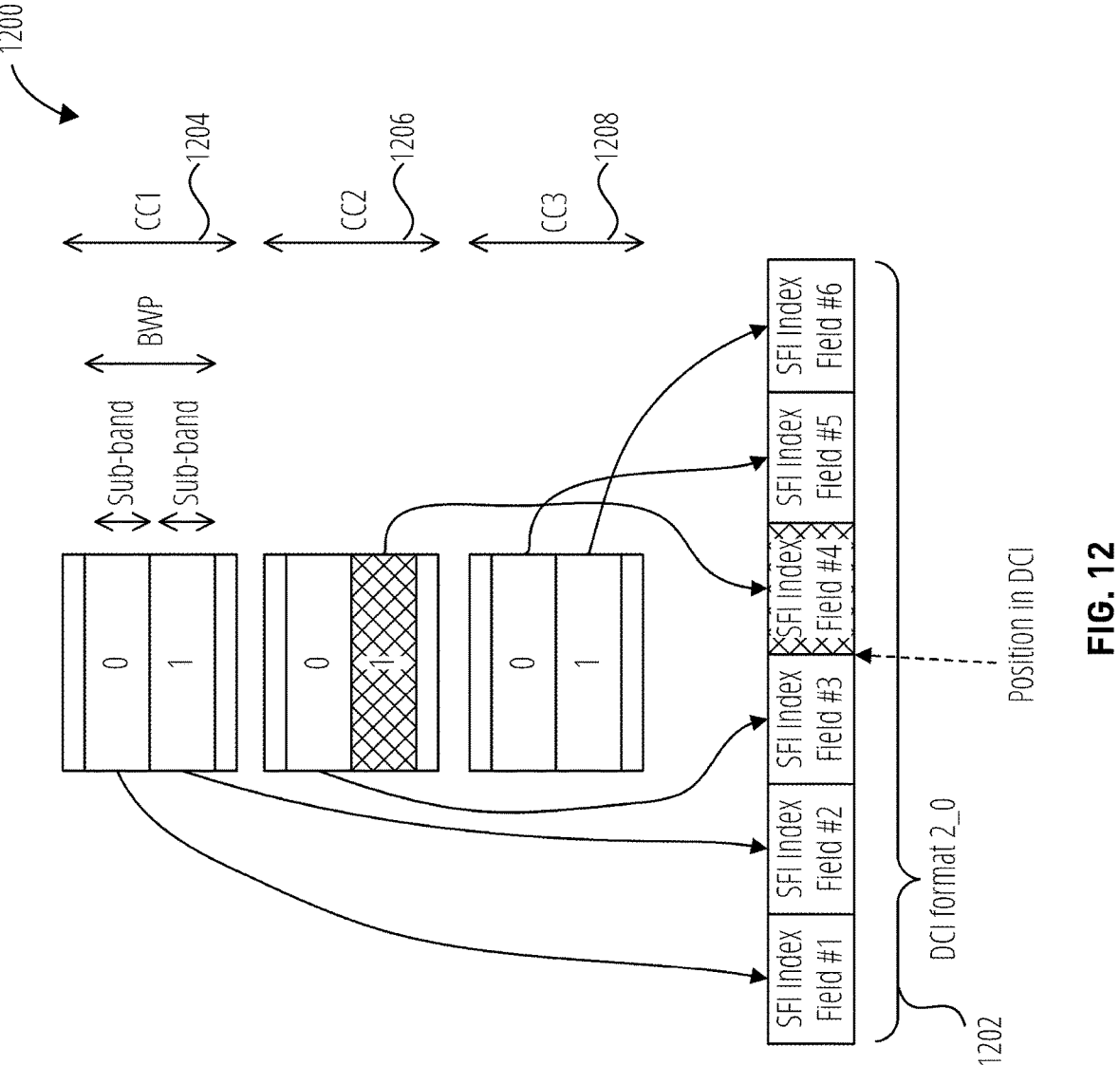
FIG. 12 illustrates a diagram showing a cross-SB DCI as may be used under an embodiment of an Approach 2-based slot format indication mechanism.

FIG. 12 illustrates a diagram 1200 showing a cross-SB DCI 1202 (e.g., of a DCI format 2_0) as may be used under an embodiment of an Approach 2-based SFI mechanism. The diagram 1200 illustrates that the UE can use three CCs to communicate with the network (the CC1 1204, the CC2 1206, and the CC3 1208), and that each CC corresponds of SBs configured within a BWP used by the UE on that respective CC. Note that while each pair of SBs for a respective CC is labeled "0" and "1" in the diagram 1200, these should be understood to be SB indexes that are relative to the individual supporting BWP/CC and not relative to a "global" frequency BW (accordingly, the same index does not necessarily represent the same physical BW).

Referring to FIG. 12, for each sub-band in a CC, the association between SB and SFI index field in the DCI 1202 corresponding to, e.g., a location of an SFI index field as related in a positionInDCI IE may be established as illustrated by arrows in the diagram 1200 corresponding to Table 1:

TABLE 1

| Association between SFI index field and SB in a CC | | |
| --- | --- | --- |
| | CC1 | CC2 | CC3 |
| SB #0 | SFI index field #1 | SFI index field #3 | SFI index field #5 |
| SB #1 | SFI index field #2 | SFI index field #4 | SFI index field #6 |

In such a case, the UE may be provided with a value of positionInDCI for SFI index field #4, which is used to make a slot format indication for SB #1 in CC #2 (this correspondence is shown by shading in the diagram 1200). Then, when the UE receives the DCI 1202, the value at this position (e.g., the SFI index field value at the SFI index field #4) may be matched to a slot format combination for SB #1 in CC #2 (e.g., is matched to a value of a slotFormatCombinationID IE for one of the slot format combinations for SB #1 in CC #2). The slot format combination(s) of that slot format combination may accordingly be used for SB #1 in CC #2.

Accordingly to the above discussion, SFI index field values found in SFI index fields in DCI may be understood as examples of slot format information.

FIG. 13 illustrates a method 1300 of a UE, according to an embodiment. The method 1300 includes receiving 1302, from a network, SB configuration information identifying a plurality of SBs useable by the UE to communicate with the network.

The method 1300 further includes receiving 1304, from the network, a DCI in a CORESET of a first SB of the plurality of SBs, wherein the DCI provides slot format information for the plurality of SBs.

The method 1300 further includes communicating 1306 with the network on the plurality of SBs using slot formats for the plurality of SBs determined using the slot format information for the plurality of SBs.

In some embodiments of the method 1300, at least two of the plurality of SBs are located on a same BWP.

In some embodiments of the method 1300, the plurality of SBs is located on a plurality of BWPs.

In some embodiments of the method 1300, the plurality of SBs is located on a plurality of carriers of a plurality of serving cells.

In some embodiments, the method 1300 further includes receiving, from the network, a bitmap comprising bits corresponding to the plurality of SBs, wherein each bit of the bitmap indicates whether a corresponding SB of the plurality of SBs is to be monitored, the SBs indicated for monitoring comprising the first SB where the DCI is received, and monitoring for the DCI on the indicated corresponding SBs.

In some embodiments of the method 1300, the DCI provides the slot format information for the plurality of SBs in SFI index fields corresponding to the plurality of SBs, each SFI index field having an SFI index field value indicating slot format information for a corresponding SB of the plurality of SBs. In some such embodiments, the method 1300 further includes receiving, from the network, for each of the plurality of SBs: a location of an SFI index field corresponding to the respective SB according to a DCI format of the DCI and one or more slot format combinations, each comprising: one or more representative slot formats and a representative SFI index field value associated with the slot format combination. In some such cases using SFI index fields, the method 1300 further includes locating an SFI index field for a selected SB of the plurality of SBs in the DCI using the location of the SFI index field for the selected SB, obtaining a first SFI index field value corresponding to the selected SB from the SFI index field for the selected SB, identifying a first slot format combination of the one or more slot format combinations for the selected SB by matching its representative SFI index field value to the first SFI index field value from the SFI index field for the selected SB, and determining one or more of the slot formats that is for the selected SB according to the representative slot formats of the first slot format combination.

In some embodiments, the method 1300 further includes monitoring a Type3 PDCCH CSS in the first SB for the DCI, wherein the DCI is received in the Type3 PDCCH CSS.

In some embodiments of the method 1300, the DCI is a DCI format 2_0 that is used to notify the UE of the slot formats for the plurality of SBs.

In some embodiments of the method 1300, the DCI comprises cyclic redundancy check (CRC) bits that are scrambled by a slot format indication radio network temporary identifier (SFI-RNTI).

FIG. 14 illustrates a method 1400 of a RAN, according to an embodiment. The method 1400 includes sending 1402, to a UE, SB configuration information identifying a plurality of SBs of a serving cell useable by the UE to communicate with the network.

The method 1400 further includes sending 1404, to the UE, a DCI in a CORESET of a first SB of the plurality of SBs, wherein the DCI provides slot format information for the plurality of SBs.

The method 1400 further includes communicating 1406 with the UE on the plurality of SBs using slot formats for the plurality of SBs corresponding to the slot format information for the plurality of SBs.

In some embodiments of the method 1400, at least two of the plurality of SBs are located on a same BWP.

In some embodiments of the method 1400, the plurality of SBs is located on a plurality of BWPs.

In some embodiments of the method 1400, the plurality of SBs is located on a plurality of carriers of a plurality of serving cells.

In some embodiments, the method 1400 further includes sending, to the UE, a bitmap comprising bits corresponding to the plurality of SBs, wherein each bit of the bitmap indicates whether a corresponding SB of the plurality of SBs is to be monitored by the UE, and wherein the SBs indicated for monitoring comprise the first SB where the DCI is sent.

In some embodiments of the method 1400, the DCI provides the slot format information for the plurality of SBs in SFI index fields corresponding to the plurality of SBs, each SFI index field having an SFI index field value indicating slot format information for a corresponding SB of the plurality of SBs. In some such embodiments, the method 1400 further includes sending, to the UE, for each of the plurality of SBs: a location of an SFI index field corresponding to the respective SB according to a DCI format of the DCI and one or more slot format combinations, each comprising: one or more representative slot formats and a representative SFI index field value associated with the slot format combination.

In some embodiments of the method 1400, the DCI is sent in a Type3 PDCCH CSS in the first SB.

In some embodiments of the method 1400, the DCI is a DCI format 2_0 that that is used to notify the UE of the slot formats for the plurality of SBs.

In some embodiments, the method 1400 further includes scrambling CRC bits of the DCI using a SFI-RNTI prior to sending the DCI.

SBS UL Resources for Initial Access

Embodiments herein relate to approaches for the use of SBS UL resources for initial access. In some embodiments, a UE may be provided with a multiple random access channel (RACH) configurations. In some such cases, UE may also be provided with SB configuration information along with respective SB directional information in a SIB (e.g., SIB1), consistent with other disclosure herein. In such cases, it may be that the RACH configurations provide separate initial UL BWPs for random access in SIB1. For example, it may be that a first initial UL BWP having a first bandwidth may be configured and used by a first set of UEs (e.g., that is for use by UEs regardless of their support for XDD functionality). Then, at least one additional/separate initial UL BWP(s) may be configured for (additional) use by a second set of UEs, corresponding to an XDD capability of those UEs.

Any such additional initial UL BWP(s) for the XDD UEs may be configured by aggregating one or more SBs. Further, such additional initial UL BWP(s) may be of a BW that is smaller, equal to, or larger than a BW than the first initial UL BWP, and may be co-located in/with, outside, or partially overlapping with a BW of the first initial UL BWP.

Figure 15:
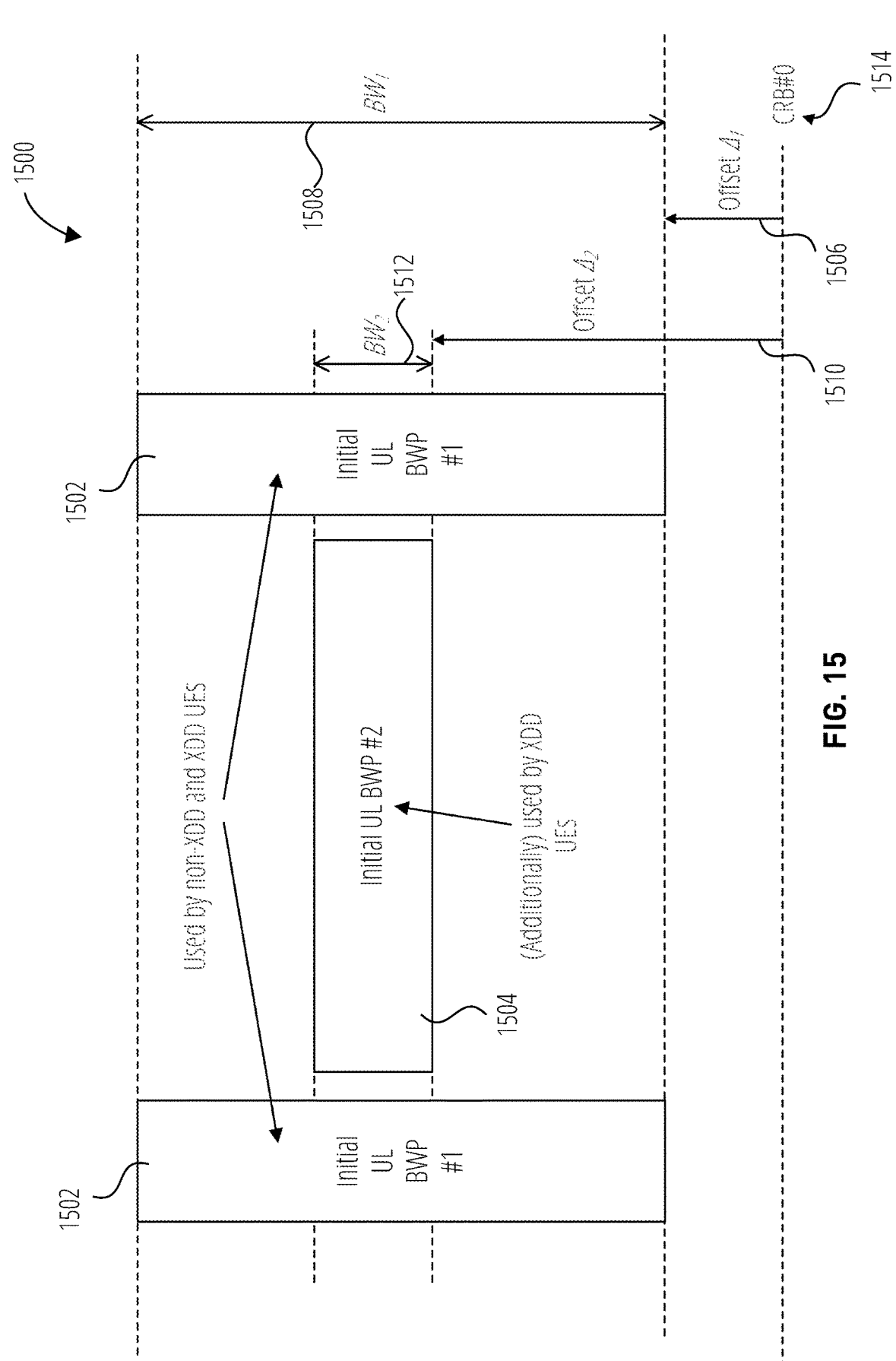
FIG. 15 illustrates a diagram showing one example of initial UL BWP configurations for a serving cell corresponding to XDD operation.

FIG. 15 illustrates a diagram 1500 showing one example of initial UL BWP configurations for a serving cell corresponding to XDD operation. Two initial UL BWPs, the initial UL BWP #1 1502 and the initial UL BWP #2 1504, may be provided in SIB1 with separate UL/DL configurations. The initial UL BWP #1 1502 may be provided by a tdd-UL-DLConfigurationCommon IE and used by both non-XDD capable UEs and XDD capable UEs to perform random access procedures. The initial UL BWP #1 1502 may be configured with a first offset value 1506 relative to a common reference block (CRB) #0 1514 configured by the network and a first BW 1508, as illustrated.

The initial UL BWP #2 1504 is separately configured with a second offset value 1510 and a second BW 1512, together with an UL/DL configuration (e.g., in the form of semi-static SB directional information relative to one or more SBs for the initial UL BWP #2 1504) provided by a tdd-UL-DL-ConfigurationCommonXDD IE. The UL/DL configuration associated with the initial UL BWP #2 1504 overrides flexible symbols provided by the UL/DL configuration provided by tdd-UL-DLConfigurationCommon (e.g., due to the fact that the initial UL BWP #2 1504 occupies a second BW 1512 that overlaps (in this case entirely) with the first BW 1508 of the initial UL BWP #1 1502).

The initial UL BWP #2 1504 may be used by XDD capable UEs to perform random access procedures. Note that the initial UL BWP #2 1504 is not utilizable by non-XDD capable UEs, at least because some of the resources thereof may be used as DL resources for such non-XDD capable UEs from system perspective.

According to certain embodiments, a UE may be provided by SIB1 with all or with a sub-set of configurations for each XDD-specific initial UL BWP (e.g., the initial UL BWP #2 1504). Separate RACH configurations for each XDD-specific initial UL BWP may be provided. These RACH configurations may include one or more of: a first parameter defining a number of the PRACH resources of the initial UL BWP that are frequency division multiplexed (FDMed) in a single time instance of a RACH occasion (RO) of the initial UL BWP, a second parameter defining an offset to a lowest PRACH resource in the frequency domain of the PRACH resources of the initial UL BWP, and/or a third parameter defining an RO density in the time domain for ROs in the second initial UL BWP.

The first parameter (defining a number of the PRACH resources of the initial UL BWP that are FDMed in a single time instance of an RO of an XDD-specific initial UL BWP) may use a smaller value as compared to the analogous value for a non-XDD-specific initial UL BWP (e.g., the initial UL BWP #1 1502) due to an relatively increased number of ROs in the time domain that may occur in the XDD-specific initial UL BWP.

The second parameter (defining an offset to a lowest PRACH resource in the frequency domain of the PRACH resources of an XDD-specific initial UL BWP) may give the offset relative to a lowest PRB in the BW of a serving cell in which the initial UL BWP #2 1504 is located and which is accordingly being used by the UE to communicate with the network, relative to a CRB #0 that is configured by the network, or relative to a lowest PRB of the second initial UL BWP.

The third parameter (defining an RO density in the time domain for ROs in an XDD-specific initial UL BWP) may be used to allow the network (e.g., the applicable base station) to configure a different RO density in the time domain compared to an RO density for ROs of the non-XDD-specific initial UL BWP. For example, the network may specify the RO density for the non-XDD initial UL BWP corresponding to a first periodicity, and may further specify (through the third parameter) the RO density for the non-XDD initial UL BWP corresponding a second periodicity, where the first periodicity is larger than the second periodicity.

In some wireless communication systems, the first parameter may be sent in a msg1-FDM-XDD-18 IE, the second parameter may be sent in a msg1-FrequencyStart-XDD-r18 IE, and the third parameter may be sent in a prach-ConfigurationIndex-XDD-r18 IE. Table 2 summarizes these uses:

TABLE 2

RACH parameters for each XDD-specific initial UL BWP

| Parameter Name | Description |
| --- | --- |
| msg1-FDM-XDD-r18 | The number of PRACH resources FDMed in one time instance of an RO within the XDD-specific initial UL BWP |
| msg1-FrequencyStart-XDD-r18 | The offset of the lowest PRACH resource in the frequency domain for the XDD-specific initial UL BWP |

19

TABLE 2-continued

RACH parameters for each XDD-specific initial UL BWP

| Parameter Name | Description |
| --- | --- |
| prach-ConfigurationIndex-XDD-r18 | A PRACH configuration index providing an RO density for the XDD-specific initial UL BWP |

In addition, separate PUCCH resources may be configured for each XDD-specific initial UL BWP. These PUCCH resources may be used for, for example, sending HARQ-ACK feedback corresponding to Msg4 of a random access procedure to the network.

Configured parameters may include a first parameter defining locations of PUCCH resources within the XDD-specific initial UL BWP and/or a second parameter providing an indication of where the PUCCH resources are located within the XDD-specific initial UL BWP in a frequency domain according to an intra-slot frequency hopping mechanism.

For the first parameter (defining locations of PUCCH resources within the XDD-specific initial UL BWP), one entry from a predefined PUCCH resource table for an XDD-specific initial UL BWP may be selected for use.

The second parameter (providing an indication of where the PUCCH resources are located within an XDD-specific initial UL BWP in a frequency domain according to an intra-slot frequency hopping mechanism) may be used to enable/disable frequency hopping (e.g., to avoid PUSCH resource segmentation in certain cases).

In some wireless communication systems, the first parameter may be sent in a pucch-ResourceCommon-XDD-r18 IE and the second parameter may be sent in a msg1-intra-slot frequency-hopping-r18 IE. Table 3 summarizes these uses:

TABLE 3

PUCCH parameters for each XDD-specific UL BWP

| Parameter Name | Description |
| --- | --- |
| pucch-ResourceCommon-XDD-r18 | An entry into a 16-row table where each row configures a set of cell-specific PUCCH resources/parameters. The UE uses those PUCCH resources until it is provided with a dedicated PUCCH-Config (e.g. during initial access) on the XDD-specific initial uplink BWP. |
| intra-slot-frequency-hopping-r18 | Configuration of intra-slot frequency hopping for all PUCCH formats. |

Figure 16:
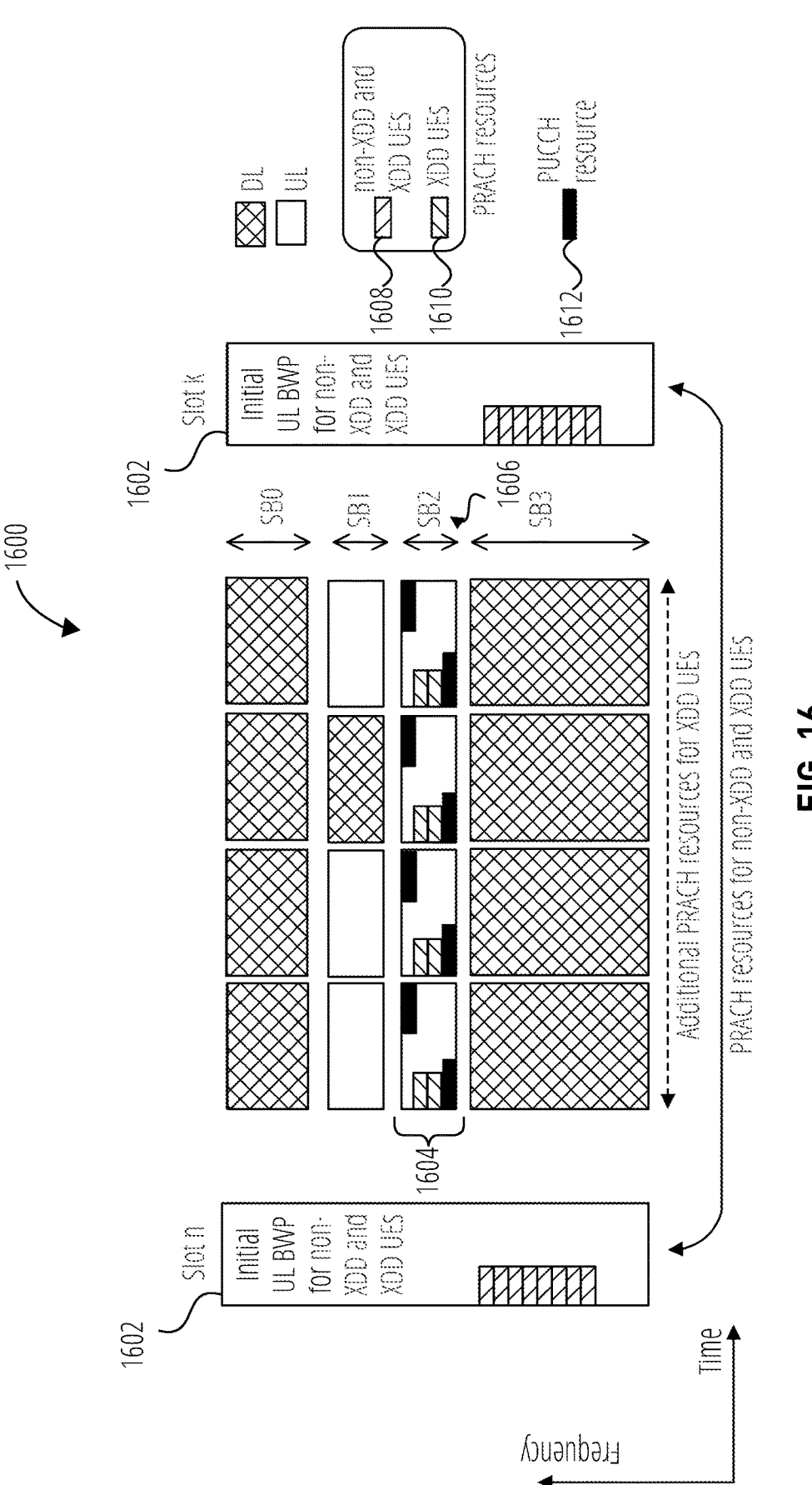
FIG. 16 illustrates a diagram of one example for configuration for XDD-specific PRACH resources by configuring additional PRACH/PUCCH resources for use by XDD-capable UEs.

FIG. 16 illustrates a diagram 1600 of one example for configuration for XDD-specific PRACH resources by configuring additional PRACH/PUCCH resources for use by XDD-capable UEs. The diagram 1600 corresponds to a pair of RACH configurations, one for a first initial UL BWP 1602 having first PRACH resources 1608 useable by both non-XDD-capable and XDD-capable UEs, and one for a second initial UL BWP 1604 having second PRACH resources 1610 useable by XDD-capable UEs.

As can be seen, the second initial UL BWP 1604 uses/is configured on the SB #2 1606. Further, as indicated in the diagram 1600, this second initial UL BWP 1604 provides the second PRACH resources 1610 as additional PRACH resources useable by XDD-capable UEs (e.g., in addition to the first PRACH resources 1608 provided in the first initial UL BWP 1602).

As can be seen with reference to the diagram 1600, different RACH configurations may provide for a different number of FDMed PRACH resources within their corresponding ROs. In the RACH configuration corresponding to the first initial UL BWP 1602, a parameter for a number of the PRACH resources of the initial UL BWP that are FDMed in a single time instance of an RO (e.g., as may be found in a msg1-FDM IE in some wireless communication systems) is eight, as illustrated by the columns of the first PRACH resources 1608 in the first initial UL BWP 1602 that are eight tall. In the RACH configuration corresponding to the second initial UL BWP 1604, a parameter for a number of the PRACH resources of the initial UL BWP that are FDMed in a single time instance of an RO (e.g., as may be found in a msg1-FDM-XDD-r18 IE) is two, as illustrated by the columns of the second PRACH resources 1610 in the second initial UL BWP 1604 that are two tall.

Further, different RACH configurations may use different values for defining an RO density in the time domain. For example, in the RACH configuration corresponding to the first initial UL BWP 1602, a value for a RO density that is applicable across all SBs in the arrangement of the diagram 1600 (e.g., as may be found in aprach-ConfigurationIndex IE) may be used, while second PRACH configuration corresponding to the second initial UL BWP 1604 may use a value for an RO density (different than the first) that is applicable to XDD operation by XDD-capable UEs in SB #2 1606 (e.g., as may be found in a prach-ConfigurationIndex-XDD-r18 IE) may (also) be used.

It may also be seen that in the RACH configuration corresponding to the first initial UL BWP 1602, the PUCCH resources 1612 are configured for use (e.g., for HARQ-ACK feedback corresponding to Msg4 of a random access procedure).

It is noted that that multiple XDD-specific initial UL BWPs may be configured, with each having their own PRACH resources for offloading purposes.

The use of the second initial UL BWP 1604 in the manner described may act to reduce the random access latency for an XDD-capable UE using the second initial UL BWP 1604 over the case where only the first initial UL BWP 1602 is used/accessible by a UE (because ROs corresponding to the second PRACH resources 1610 occur more frequently).

FIG. 17 illustrates a method 1700 of a UE, according to an embodiment. The method 1700 includes receiving 1702, from a network, a first RACH configuration for a first initial UL BWP having a first BW, the first RACH configuration defining first PRACH resources of the first initial UL BWP.

The method 1700 further includes In receiving 1704, from the network, a second RACH configuration for a second initial UL BWP having a second BW, the second RACH configuration defining second PRACH resources of the second initial UL BWP that are available during time instances where the first PRACH resources defined by the first RACH configuration are not available to the UE for random access.

The method 1700 further includes performing 1706 at least a portion of a random access procedure with the network using one or more of the second PRACH resources of the second initial UL BWP.

In some embodiments of the method 1700, the second RACH configuration includes a parameter defining a number of the second PRACH resources of the second initial UL BWP that are FDMed in a single time instance of a RO of the second initial UL BWP.

In some embodiments of the method 1700, the second RACH configuration includes a parameter defining an offset to a lowest PRACH resource in a frequency domain of the second PRACH resources of the second initial UL BWP. In some such embodiments, the offset is relative to a lowest PRB in the BW of a serving cell used by the UE to communicate with the network. In some such embodiments, the offset is relative to a common reference block (CRB) #0 that is configured by the network. In some such embodiments, the offset is relative to a lowest PRB of the second initial UL BWP.

In some embodiments of the method 1700, first RACH ROs occur corresponding to the first RACH configuration in the first initial UL BWP with a first RO density in a time domain, and wherein the second RACH configuration includes a parameter defining a second RO density in the time domain for second ROs in the second initial UL BWP. In some such embodiments, the first RO density corresponds to a first periodicity that is larger than a second periodicity corresponding to the second RO density.

In some embodiments, the method 1700 further includes receiving, from the network, a PUCCH configuration for PUCCH resources of the second initial UL BWP and sending, to the network, HARQ-ACK feedback corresponding to the random access procedure on a first PUCCH resource of the PUCCH resources of the second initial UL BWP. In some such embodiments, the PUCCH configuration includes a parameter defining locations of the PUCCH resources within the second initial UL BWP. In some such embodiments, the PUCCH configuration includes an indication of where the PUCCH resources are located within the second initial UL BWP in a frequency domain according to an intra-slot frequency hopping mechanism.

In some embodiments of the method 1700, the second RACH configuration is received from the network in SIB1.

FIG. 18 illustrates a method 1800 of a RAN, according to an embodiment. The method 1800 includes sending 1802, to a UE, a first RACH configuration for a first initial UL BWP having a first BW, the first RACH configuration defining first PRACH resources of the first initial UL BWP.

The method 1800 further includes sending 1804, to the UE, a second RACH configuration for a second initial UL BWP having a second BW, the second RACH configuration defining second PRACH resources of the second initial UL BWP that are available during time instances where the first PRACH resources defined by the first RACH configuration are not available to the UE for random access.

The method 1800 further includes performing 1806 at least a portion of a random access procedure with the UE using one or more of the second PRACH resources of the second initial UL BWP.

In some embodiments of the method 1800, the second RACH configuration includes a parameter defining a number of the second PRACH resources of the second initial UL BWP that are FDMed in a single time instance of a RO of the second initial UL BWP.

In some embodiments of the method 1800, the second RACH configuration includes a parameter defining an offset to a lowest PRACH resource in a frequency domain of the second PRACH resources of the second initial UL BWP. In some such embodiments, the offset is relative to a lowest PRB in the BW of a serving cell used by the RAN to communicate with the UE. In some such embodiments, the offset is relative to a CRB #0 that is configured by the RAN.

In some such embodiments, the offset is relative to a lowest PRB of the second initial UL BWP.

In some embodiments of the method 1800, first ROs occur corresponding to the first RACH configuration in the first initial UL BWP with a first RO density in a time domain, and wherein the second RACH configuration includes a parameter defining a second RO density in the time domain for second ROs in the second initial UL BWP. In some such embodiments, the first RO density corresponds to a first periodicity that is larger than a second periodicity corresponding to the second RO density.

In some embodiments, the method 1800 further includes sending, to the UE, a PUCCH configuration for PUCCH resources of the second initial UL BWP and receiving, from the UE, HARQ-ACK feedback corresponding to the random access procedure on a first PUCCH resource of the PUCCH resources of the second initial UL BWP. In some such embodiments, the PUCCH configuration includes a parameter defining locations of the PUCCH resources within the second initial UL BWP. In some such embodiments, the PUCCH configuration includes an indication of where the PUCCH resources are located within the second initial UL BWP in a frequency domain according to an intra-slot frequency hopping mechanism.

In some embodiments of the method 1800, the second RACH configuration is sent to the UE in system information block 1 (SIB1).

Figure 19:
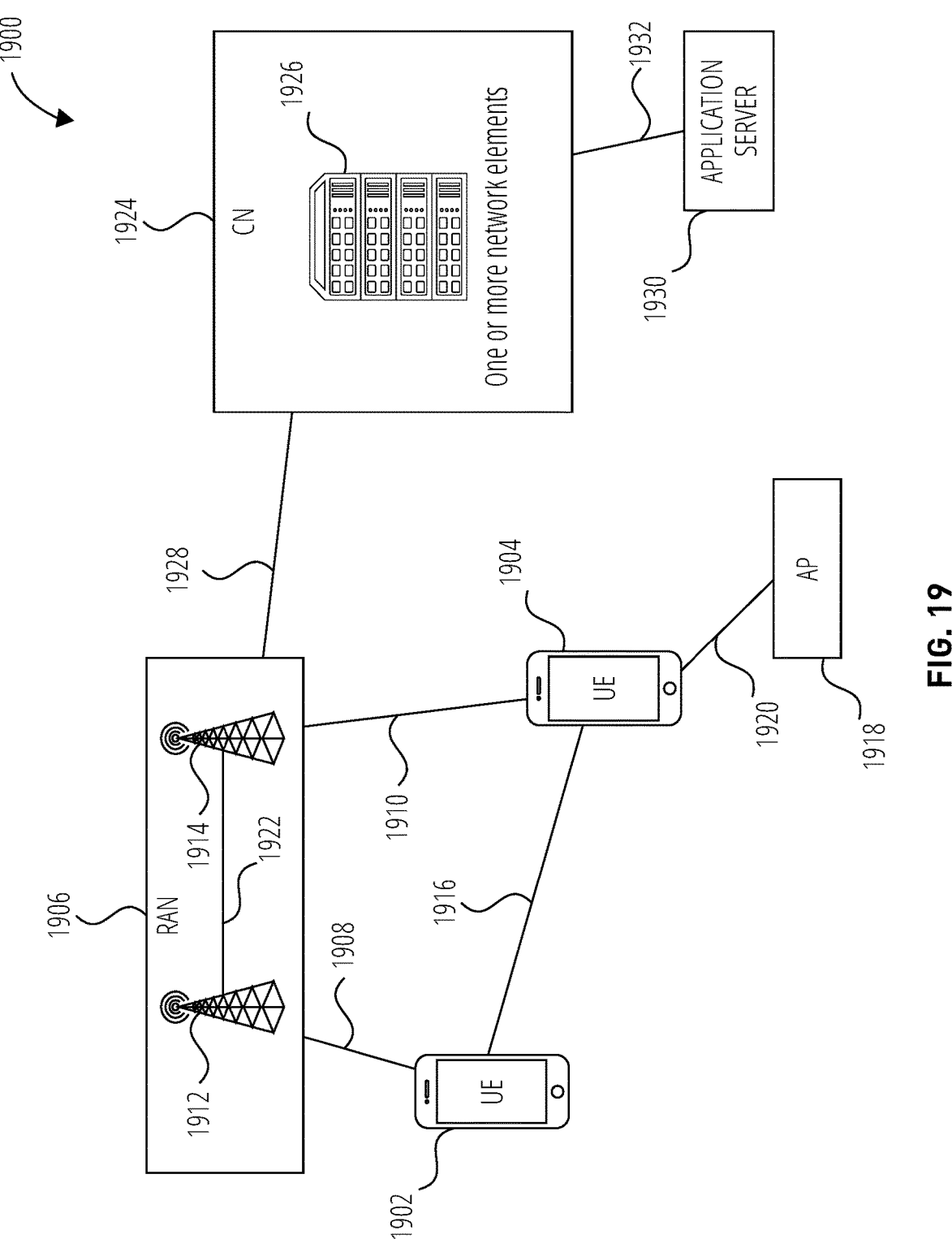
FIG. 19 illustrates an example architecture of a wireless communication system, according to embodiments disclosed herein.

FIG. 19 illustrates an example architecture of a wireless communication system 1900, according to embodiments disclosed herein. The following description is provided for an example wireless communication system 1900 that operates in conjunction with the LTE system standards and/or 5G or NR system standards as provided by 3GPP technical specifications.

As shown by FIG. 19, the wireless communication system 1900 includes UE 1902 and UE 1904 (although any number of UEs may be used). In this example, the UE 1902 and the UE 1904 are illustrated as smartphones (e.g., handheld touchscreen mobile computing devices connectable to one or more cellular networks), but may also comprise any mobile or non-mobile computing device configured for wireless communication.

The UE 1902 and UE 1904 may be configured to communicatively couple with a RAN 1906. In embodiments, the RAN 1906 may be NG-RAN, E-UTRAN, etc. The UE 1902 and UE 1904 utilize connections (or channels) (shown as connection 1908 and connection 1910, respectively) with the RAN 1906, each of which comprises a physical communications interface. The RAN 1906 can include one or more base stations, such as base station 1912 and base station 1914, that enable the connection 1908 and connection 1910.

In this example, the connection 1908 and connection 1910 are air interfaces to enable such communicative coupling, and may be consistent with RAT(s) used by the RAN 1906, such as, for example, an LTE and/or NR.

In some embodiments, the UE 1902 and UE 1904 may also directly exchange communication data via a sidelink interface 1916. The UE 1904 is shown to be configured to access an access point (shown as AP 1918) via connection 1920. By way of example, the connection 1920 can comprise a local wireless connection, such as a connection consistent with any IEEE 802.11 protocol, wherein the AP 1918 may comprise a Wi-Fi® router. In this example, the AP 1918 may be connected to another network (for example, the Internet) without going through a CN 1924.

In embodiments, the UE 1902 and UE 1904 can be configured to communicate using orthogonal frequency division multiplexing (OFDM) communication signals with each other or with the base station 1912 and/or the base station 1914 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1912 or base station 1914 may be implemented as one or more software entities running on server computers as part of a virtual network. In addition, or in other embodiments, the base station 1912 or base station 1914 may be configured to communicate with one another via interface 1922. In embodiments where the wireless communication system 1900 is an LTE system (e.g., when the CN 1924 is an EPC), the interface 1922 may be an X2 interface. The X2 interface may be defined between two or more base stations (e.g., two or more eNBs and the like) that connect to an EPC, and/or between two eNBs connecting to the EPC. In embodiments where the wireless communication system 1900 is an NR system (e.g., when CN 1924 is a 5GC), the interface 1922 may be an Xn interface. The Xn interface is defined between two or more base stations (e.g., two or more gNBs and the like) that connect to 5GC, between a base station 1912 (e.g., a gNB) connecting to 5GC and an eNB, and/or between two eNBs connecting to 5GC (e.g., CN 1924).

The RAN 1906 is shown to be communicatively coupled to the CN 1924. The CN 1924 may comprise one or more network elements 1926, which are configured to offer various data and telecommunications services to customers/subscribers (e.g., users of UE 1902 and UE 1904) who are connected to the CN 1924 via the RAN 1906. The components of the CN 1924 may be implemented in one physical device or separate physical devices including components to read and execute instructions from a machine-readable or computer-readable medium (e.g., a non-transitory machine-readable storage medium).

In embodiments, the CN 1924 may be an EPC, and the RAN 1906 may be connected with the CN 1924 via an S1 interface 1928. In embodiments, the S1 interface 1928 may be split into two parts, an S1 user plane (S1-U) interface, which carries traffic data between the base station 1912 or base station 1914 and a serving gateway (S-GW), and the S1-MME interface, which is a signaling interface between the base station 1912 or base station 1914 and mobility management entities (MMEs).

In embodiments, the CN 1924 may be a 5GC, and the RAN 1906 may be connected with the CN 1924 via an NG interface 1928. In embodiments, the NG interface 1928 may be split into two parts, an NG user plane (NG-U) interface, which carries traffic data between the base station 1912 or base station 1914 and a user plane function (UPF), and the S1 control plane (NG-C) interface, which is a signaling interface between the base station 1912 or base station 1914 and access and mobility management functions (AMFs).

Generally, an application server 1930 may be an element offering applications that use internet protocol (IP) bearer resources with the CN 1924 (e.g., packet switched data services). The application server 1930 can also be configured to support one or more communication services (e.g., VoIP sessions, group communication sessions, etc.) for the UE 1902 and UE 1904 via the CN 1924. The application server 1930 may communicate with the CN 1924 through an IP communications interface 1932.

Figure 20:
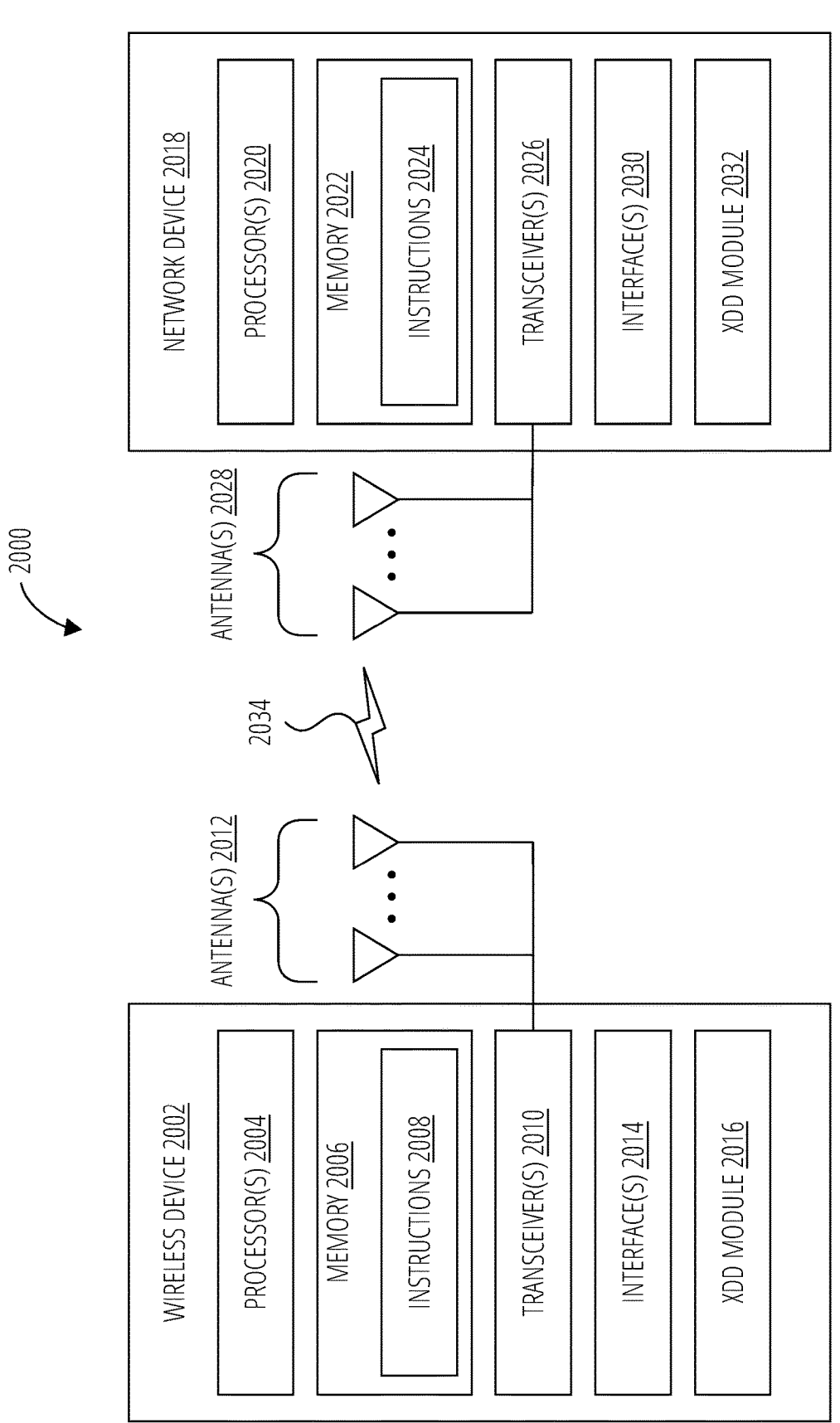
FIG. 20 illustrates a system for performing signaling between a wireless device and a network device, according to embodiments disclosed herein.

FIG. 20 illustrates a system 2000 for performing signaling 2034 between a wireless device 2002 and a network device 2018, according to embodiments disclosed herein. The system 2000 may be a portion of a wireless communications system as herein described. The wireless device 2002 may be, for example, a UE of a wireless communication system. The network device 2018 may include, for example, one or more devices, including a base station (e.g., an eNB or a gNB) of a wireless communication system and/or a device of a CN of the wireless communication system.

The wireless device 2002 may include one or more processor(s) 2004. The processor(s) 2004 may execute instructions such that various operations of the wireless device 2002 are performed, as described herein. The processor(s) 2004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 2002 may include a memory 2006. The memory 2006 may be a non-transitory computer-readable storage medium that stores instructions 2008 (which may include, for example, the instructions being executed by the processor(s) 2004). The instructions 2008 may also be referred to as program code or a computer program. The memory 2006 may also store data used by, and results computed by, the processor(s) 2004.

The wireless device 2002 may include one or more transceiver(s) 2010 that may include radio frequency (RF) transmitter and/or receiver circuitry that use the antenna(s) 2012 of the wireless device 2002 to facilitate signaling (e.g., the signaling 2034) to and/or from the wireless device 2002 with other devices (e.g., the network device 2018) according to corresponding RATs.

The wireless device 2002 may include one or more antenna(s) 2012 (e.g., one, two, four, or more). For embodiments with multiple antenna(s) 2012, the wireless device 2002 may leverage the spatial diversity of such multiple antenna(s) 2012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 2002 may be accomplished according to precoding (or digital beamforming) that is applied at the wireless device 2002 that multiplexes the data streams across the antenna(s) 2012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 2002 may implement analog beamforming techniques, whereby phases of the signals sent by the antenna(s) 2012 are relatively adjusted such that the (joint) transmission of the antenna(s) 2012 can be directed (this is sometimes referred to as beam steering).

The wireless device 2002 may include one or more interface(s) 2014. The interface(s) 2014 may be used to provide input to or output from the wireless device 2002. For example, a wireless device 2002 that is a UE may include interface(s) 2014 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 2010/ antenna(s) 2012 already described) that allow for communication between the UE and other devices and may operate according to known protocols (e.g., Wi-Fi®, Bluetooth®, and the like).

The wireless device 2002 may include an XDD module 2016. The XDD module 2016 may be implemented via hardware, software, or combinations thereof. For example, the XDD module 2016 may be implemented as a processor, circuit, and/or instructions 2008 stored in the memory 2006 and executed by the processor(s) 2004. In some examples, the XDD module 2016 may be integrated within the processor(s) 2004 and/or the transceiver(s) 2010. For example, the XDD module 2016 may be implemented by a combination of software components (e.g., executed by a DSP or a general processor) and hardware components (e.g., logic gates and circuitry) within the processor(s) 2004 or the transceiver(s) 2010.

The XDD module 2016 may be used for various aspects of the present disclosure, for example, aspects of FIG. 1 to FIG. 18. For example, the XDD module 2016 may be used to perform one or more aspects corresponding to any of the method 500, the method 800, the method 1300, and/or the method 1700.

The network device 2018 may include one or more processor(s) 2020. The processor(s) 2020 may execute instructions such that various operations of the network device 2018 are performed, as described herein. The processor(s) 2020 may include one or more baseband processors implemented using, for example, a CPU, a DSP, an ASIC, a controller, an FPGA device, another hardware device, a firmware device, or any combination thereof configured to perform the operations described herein.

The network device 2018 may include a memory 2022. The memory 2022 may be a non-transitory computer-readable storage medium that stores instructions 2024 (which may include, for example, the instructions being executed by the processor(s) 2020). The instructions 2024 may also be referred to as program code or a computer program. The memory 2022 may also store data used by, and results computed by, the processor(s) 2020.

The network device 2018 may include one or more transceiver(s) 2026 that may include RF transmitter and/or receiver circuitry that use the antenna(s) 2028 of the network device 2018 to facilitate signaling (e.g., the signaling 2034) to and/or from the network device 2018 with other devices (e.g., the wireless device 2002) according to corresponding RATs.

The network device 2018 may include one or more antenna(s) 2028 (e.g., one, two, four, or more). In embodiments having multiple antenna(s) 2028, the network device 2018 may perform MIMO, digital beamforming, analog beamforming, beam steering, etc., as has been described.

The network device 2018 may include one or more interface(s) 2030. The interface(s) 2030 may be used to provide input to or output from the network device 2018. For example, a network device 2018 that is a base station may include interface(s) 2030 made up of transmitters, receivers, and other circuitry (e.g., other than the transceiver(s) 2026/ antenna(s) 2028 already described) that enables the base station to communicate with other equipment in a core network, and/or that enables the base station to communicate with external networks, computers, databases, and the like for purposes of operations, administration, and maintenance of the base station or other equipment operably connected thereto.

The network device 2018 may include an XDD module 2032. The XDD module 2032 may be implemented via hardware, software, or combinations thereof. For example, the XDD module 2032 may be implemented as a processor, circuit, and/or instructions 2024 stored in the memory 2022 and executed by the processor(s) 2020. In some examples, the XDD module 2032 may be integrated within the processor(s) 2020 and/or the transceiver(s) 2026. For example, the XDD module 2032 may be implemented by a combination of software components (e.g., executed by a DSP or a general processor) and hardware components (e.g., logic gates and circuitry) within the processor(s) 2020 or the transceiver(s) 2026.

The XDD module 2032 may be used for various aspects of the present disclosure, for example, aspects of FIG. 1 to FIG. 18. For example, the XDD module 2032 may be used to perform one or more aspects corresponding to the method 600, the method 900, the 1400, and/or the method 1800.

Embodiments contemplated herein include an apparatus comprising means to perform one or more elements of any of the method 500, the method 800, the method 1300, and/or the method 1700. This apparatus may be, for example, an apparatus of a UE (such as a wireless device 2002 that is a UE, as described herein).

Embodiments contemplated herein include one or more non-transitory computer-readable media comprising instructions to cause an electronic device, upon execution of the instructions by one or more processors of the electronic device, to perform one or more elements of any of the method 500, the method 800, the method 1300, and/or the method 1700. This non-transitory computer-readable media may be, for example, a memory of a UE (such as a memory 2006 of a wireless device 2002 that is a UE, as described herein).

Embodiments contemplated herein include an apparatus comprising logic, modules, or circuitry to perform one or more elements of any of the method 500, the method 800, the method 1300, and/or the method 1700. This apparatus may be, for example, an apparatus of a UE (such as a wireless device 2002 that is a UE, as described herein).

Embodiments contemplated herein include an apparatus comprising: one or more processors and one or more computer-readable media comprising instructions that, when executed by the one or more processors, cause the one or more processors to perform one or more elements of any of the method 500, the method 800, the method 1300, and/or the method 1700. This apparatus may be, for example, an apparatus of a UE (such as a wireless device 2002 that is a UE, as described herein).

Embodiments contemplated herein include a signal as described in or related to one or more elements of any of the method 500, the method 800, the method 1300, and/or the method 1700.

Embodiments contemplated herein include a computer program or computer program product comprising instructions, wherein execution of the program by a processor is to cause the processor to carry out one or more elements of any of the method 500, the method 800, the method 1300, and/or the method 1700. The processor may be a processor of a UE (such as a processor(s) 2004 of a wireless device 2002 that is a UE, as described herein). These instructions may be, for example, located in the processor and/or on a memory of the UE (such as a memory 2006 of a wireless device 2002 that is a UE, as described herein).

Embodiments contemplated herein include an apparatus comprising means to perform one or more elements of any of the method 600, the method 900, the 1400, and/or the method 1800. This apparatus may be, for example, an apparatus of RAN and/or CN (including a network device 2018, as described herein).

Embodiments contemplated herein include one or more non-transitory computer-readable media comprising instructions to cause an electronic device, upon execution of the instructions by one or more processors of the electronic device, to perform one or more elements of any of the method 600, the method 900, the 1400, and/or the method 1800. This non-transitory computer-readable media may be, for example, a memory of a RAN and/or CN (such as a memory 2022 of a network device 2018, as described herein).

Embodiments contemplated herein include an apparatus comprising logic, modules, or circuitry to perform one or more elements of any of the method 600, the method 900, the 1400, and/or the method 1800. This apparatus may be, for example, an apparatus of a RAN and/or CN (such as a network device 2018, as described herein).

Embodiments contemplated herein include an apparatus comprising: one or more processors and one or more computer-readable media comprising instructions that, when executed by the one or more processors, cause the one or more processors to perform one or more elements of any of the method 600, the method 900, the 1400, and/or the method 1800. This apparatus may be, for example, an apparatus of a RAN and/or CN (such as a network device 2018, as described herein).

Embodiments contemplated herein include a signal as described in or related to one or more elements of any of the method 600, the method 900, the 1400, and/or the method 1800.

Embodiments contemplated herein include a computer program or computer program product comprising instructions, wherein execution of the program by a processing element is to cause the processing element to carry out one or more elements of any of the method 600, the method 900, the 1400, and/or the method 1800. The processor may be a processor of an apparatus of the RAN and/or CN (such as a processor(s) 2020 of a network device 2018, as described herein). These instructions may be, for example, located in the processor and/or on a memory of the apparatus (such as a memory 2022 of a network device 2018, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
receiving, from a network, sub-band (SB) configuration information identifying a plurality of frequency domain SBs that are useable by the UE to communicate with the network;
receiving, from the network, a bitmap comprising a plurality of bits each having a one-to-one correspondence with one of the plurality of frequency domain SBs, wherein each bit of the bitmap indicates whether a control resource set (CORESET) of its corresponding frequency domain SB of the plurality of frequency domain SBs is to be monitored for a downlink control information (DCI), wherein a first bit of the plurality of bits indicates that a first CORESET of a first frequency domain SB of the plurality of frequency domain SBs that corresponds to the first bit is to be monitored for the DCI;

monitoring for the DCI on the first CORESET of the first
frequency domain SB in response to determining that
the first bit of the plurality of bits indicates that the first
CORESET of the first frequency domain SB of the
plurality of frequency domain SBs that corresponds to
the first bit is to be monitored for the DCI;
receiving, from the network, the DCI in the first CORE-
SET of the first frequency domain SB of the plurality
of frequency domain SBs, wherein the DCI provides
slot format information for the plurality of frequency
domain SBs; and
communicating with the network on the plurality of
frequency domain SBs using slot formats for the plu-
rality of frequency domain SBs determined using the
slot format information for the plurality of frequency
domain SBs.

2. The method of claim 1, wherein at least two of the
plurality of frequency domain SBs are located on a same
bandwidth part (BWP).

3. The method of claim 1, wherein the plurality of
frequency domain SBs is located on a plurality of bandwidth
parts (BWPs).

4. The method of claim 1, wherein the plurality of
frequency domain SBs is located on a plurality of carriers of
a plurality of serving cells.

5. The method of claim 1, wherein the DCI provides the
slot format information for the plurality of frequency
domain SBs in slot format indication (SFI) index fields
corresponding to the plurality of frequency domain SBs,
each SFI index field having an SFI index field value indi-
cating slot format information for a corresponding SB of the
plurality of frequency domain SBs.

6. The method of claim 5, further comprising receiving,
from the network, for each of the plurality of frequency
domain SBs:
a location of an SFI index field corresponding to said each
frequency domain SB of the plurality of frequency
domain SBs according to a DCI format of the DCI; and
one or more slot format combinations, each comprising:
one or more representative slot formats; and
a representative SFI index field value associated with
the slot format combination.

7. The method of claim 6, further comprising:
locating an SFI index field for a selected frequency
domain SB of the plurality of frequency domain SBs in
the DCI using the location of the SFI index field for the
selected frequency domain SB;
obtaining a first SFI index field value corresponding to the
selected frequency domain SB from the SFI index field
for the selected frequency domain SB;
identifying a first slot format combination of the one or
more slot format combinations for the selected fre-
quency domain SB by matching its representative SFI
index field value to the first SFI index field value from
the SFI index field for the selected frequency domain
SB; and
determining one or more of the slot formats that is for the
selected frequency domain SB according to the repre-
sentative slot formats of the first slot format combina-
tion.

8. The method of claim 1, further comprising monitoring
a Type3 physical downlink control channel (PDCCH) com-
mon search space (CSS) in the first frequency domain SB for
the DCI, wherein the DCI is received in the Type3 PDCCH
CSS.

9. The method of claim 1, wherein the DCI is a DCI
format 2_0 that is used to notify the UE of the slot formats
for the plurality of frequency domain SBs.

10. The method of claim 1, wherein the DCI comprises
cyclic redundancy check (CRC) bits that are scrambled by a
slot format indication radio network temporary identifier
(SFI-RNTI).

11. A method of a base station of a radio access network
(RAN), comprising:
sending, to a user equipment (UE), sub-band (SB) con-
figuration information identifying a plurality of fre-
quency domain SBs of a serving cell that are useable by
the UE to communicate with the network;
sending, to the UE, a bitmap comprising a plurality of bits
each having a one-to-one correspondence with one of
the plurality of frequency domain SBs, wherein each
bit of the bitmap indicates whether a control resource
set (CORESET) of its corresponding frequency domain
SB of the plurality of frequency domain SBs is to be
monitored by the UE for a downlink control informa-
tion (DCI), wherein a first bit of the plurality of bits
indicates that a first CORESET of a first frequency
domain SB of the plurality of frequency domain SBs
that corresponds to the first bit is to be monitored for
the DCI;
sending, to the UE, the DCI in the first coreset of the first
frequency domain SB of the plurality of frequency
domain SBs, wherein the DCI provides slot format
information for the plurality of frequency domain SBs;
and
communicating with the UE on the plurality of frequency
domain SBs using slot formats for the plurality of
frequency domain SBs corresponding to the slot format
information for the plurality of frequency domain SBs.

12. The method of claim 11, wherein the DCI provides the
slot format information for the plurality of frequency
domain SBs in SFI index fields corresponding to the plu-
rality of frequency domain SBs, each SFI index field having
an SFI index field value indicating slot format information
for a corresponding frequency domain SB of the plurality of
frequency domain SBs.

13. The method of claim 12, further comprising sending,
to the UE, for each of the plurality of frequency domain SBs:
a location of an SFI index field corresponding to said each
of the plurality of frequency domain SBs according to
a DCI format of the DCI; and
one or more slot format combinations, each comprising:
one or more representative slot formats; and
a representative SFI index field value associated with
the slot format combination.

14. The method of claim 12, wherein the DCI is sent in a
Type3 physical downlink control channel (PDCCH) com-
mon search space (CSS) in the first frequency domain SB.

15. The method of claim 11, wherein at least two of the
plurality of frequency domain SBs are located on a same
bandwidth part (BWP).

16. The method of claim 11, wherein the plurality of
frequency domain SBs is located on a plurality of bandwidth
parts (BWPs).

17. The method of claim 11, wherein the plurality of
frequency domain SBs is located on a plurality of carriers of
a plurality of serving cells.

18. The method of claim 11, wherein the DCI is a DCI
format 2_0 that is used to notify the UE of the slot formats
for the plurality of frequency domain SBs.

19. The method of claim 11, wherein the DCI comprises cyclic redundancy check (CRC) bits that are scrambled by a slot format indication radio network temporary identifier (SFI-RNTI).

\* \* \* \* \*